（12） United States Patent
Liu

(10) Patent No.: US 8,941,607 B2
(45) Date of Patent: Jan. 27, 2015

(54) MEMS DISPLAY WITH TOUCH CONTROL FUNCTION

(76) Inventor: Hung-Ta Liu, Zhubei (TW)

( * ) Notice: Subject to any disclaimer, the term of this patent is extended or adjusted under 35 U.S.C. 154(b) by 62 days.

(21) Appl. No.: 13/475,799

(22) Filed: May 18, 2012

(65) Prior Publication Data

US 2012/0229420 A1   Sep. 13, 2012

Related U.S. Application Data

(63) Continuation-in-part of application No. 13/328,067, filed on Dec. 16, 2011, and a continuation-in-part of application No. 13/336,721, filed on Dec. 23, 2011, now abandoned.

(30) Foreign Application Priority Data

May 20, 2011   (TW) .............................. 100117825 A

(51) Int. Cl.
| | | |
|---|---|---|
| *G06F 3/041* | (2006.01) | |
| *G06F 3/044* | (2006.01) | |
| *G06F 3/046* | (2006.01) | |
| *G09G 3/34* | (2006.01) | |

(52) U.S. Cl.
CPC .............. *G06F 3/041* (2013.01); *G06F 3/0412* (2013.01); *G06F 3/044* (2013.01); *G06F 3/046* (2013.01); *G09G 3/3466* (2013.01); *G09G 2300/0426* (2013.01)
USPC .............................. 345/173; 345/174; 345/85

(58) Field of Classification Search
CPC ....... G06F 3/0412; G06F 3/043; G06F 3/046; G06F 3/047; G06F 3/044
USPC ......... 345/173, 174, 84, 85; 178/18.06, 18.07
See application file for complete search history.

(56) References Cited

U.S. PATENT DOCUMENTS

| | | | | |
|---|---|---|---|---|
| 5,606,346 | A | * | 2/1997 | Kai et al. ...................... 345/173 |
| 5,894,304 | A | * | 4/1999 | Hirano .......................... 345/179 |
| 6,417,846 | B1 | | 7/2002 | Lee ................................ 345/173 |
| 6,424,398 | B1 | * | 7/2002 | Taniguchi ...................... 349/143 |
| 7,095,545 | B2 | | 8/2006 | Regan ........................... 359/290 |
| 7,307,776 | B2 | | 12/2007 | Tsai et al. ...................... 359/291 |
| 8,243,027 | B2 | * | 8/2012 | Hotelling et al. ............. 345/173 |
| 8,259,086 | B2 | * | 9/2012 | Agari et al. ................... 345/173 |
| 8,325,130 | B2 | | 12/2012 | Nam .............................. 345/107 |
| 8,346,048 | B2 | | 1/2013 | Bita et al. ...................... 385/146 |

(Continued)

FOREIGN PATENT DOCUMENTS

| | | | |
|---|---|---|---|
| CN | 1169557 | 1/1998 | .............. G06F 3/033 |
| CN | 1591093 | 3/2005 | .............. G02B 26/00 |

(Continued)

OTHER PUBLICATIONS

Office Action issued in related U.S. Appl. No. 13/339,667, dated Aug. 1, 2013 (6 pgs).

(Continued)

*Primary Examiner* — Dmitriy Bolotin
(74) *Attorney, Agent, or Firm* — Hayes Soloway P.C.

(57) ABSTRACT

A display system using microelectromechanical system (MEMS) is disclosed. The display system includes a first substrate, a touch control unit and a plurality of MEMS display units. The first substrate has a control array. The MEMS display units are disposed in the first substrate. The control array controls the MEMS display units.

17 Claims, 14 Drawing Sheets

(56) References Cited

U.S. PATENT DOCUMENTS

| | | | |
|---|---|---|---|
| 8,405,639 B1* | 3/2013 | Fu | 345/175 |
| 8,514,189 B2* | 8/2013 | Wu et al. | 345/173 |
| 8,552,989 B2* | 10/2013 | Hotelling et al. | 345/173 |
| 2004/0105040 A1 | 6/2004 | Oh et al. | 349/12 |
| 2004/0217945 A1* | 11/2004 | Miyamoto et al. | 345/173 |
| 2006/0017710 A1 | 1/2006 | Lee et al. | |
| 2006/0066586 A1* | 3/2006 | Gally et al. | 345/173 |
| 2006/0067651 A1* | 3/2006 | Chui | 385/147 |
| 2006/0077122 A1* | 4/2006 | Gally et al. | 345/32 |
| 2006/0238487 A1* | 10/2006 | Shih | 345/102 |
| 2006/0256093 A1* | 11/2006 | Furukawa et al. | 345/173 |
| 2007/0002009 A1 | 1/2007 | Pasch et al. | 345/108 |
| 2009/0021884 A1 | 1/2009 | Nakamura | 361/233 |
| 2009/0279162 A1* | 11/2009 | Chui | 359/290 |
| 2010/0013788 A1 | 1/2010 | Park et al. | 345/174 |
| 2010/0045630 A1* | 2/2010 | Gu et al. | 345/174 |
| 2010/0045635 A1* | 2/2010 | Soo | 345/178 |
| 2010/0123673 A1 | 5/2010 | Nam | 345/173 |
| 2010/0214248 A1 | 8/2010 | Takano et al. | 345/173 |
| 2010/0258360 A1 | 10/2010 | Yilmaz | 178/18.06 |
| 2010/0295819 A1* | 11/2010 | Ozeki et al. | 345/174 |
| 2010/0328249 A1* | 12/2010 | Ningrat et al. | 345/174 |
| 2010/0328336 A1* | 12/2010 | Si | 345/589 |
| 2011/0007013 A1* | 1/2011 | Shoji | 345/173 |
| 2011/0025635 A1* | 2/2011 | Lee | 345/173 |
| 2011/0096251 A1* | 4/2011 | Son et al. | 349/15 |
| 2011/0109568 A1* | 5/2011 | Wu et al. | 345/173 |
| 2011/0109622 A1* | 5/2011 | Son et al. | 345/419 |
| 2011/0134067 A1 | 6/2011 | Joguet et al. | 345/173 |
| 2011/0157058 A1* | 6/2011 | Bita et al. | 345/173 |
| 2011/0205178 A1* | 8/2011 | Yoshida et al. | 345/173 |
| 2011/0227588 A1* | 9/2011 | Chen et al. | 324/654 |
| 2012/0026414 A1* | 2/2012 | Hsiao et al. | 348/744 |
| 2012/0075216 A1* | 3/2012 | Black et al. | 345/173 |
| 2012/0092279 A1* | 4/2012 | Martin | 345/173 |
| 2012/0092294 A1* | 4/2012 | Ganapathi et al. | 345/174 |
| 2012/0154333 A1 | 6/2012 | Gu et al. | 345/174 |
| 2012/0169400 A1* | 7/2012 | Liu | 327/517 |

FOREIGN PATENT DOCUMENTS

| | | | |
|---|---|---|---|
| CN | 101019071 | 8/2007 | G02B 5/02 |
| CN | 101937296 | 1/2011 | G06F 3/044 |
| EP | 0250931 | 1/1988 | |
| EP | 2172834 | 4/2010 | |
| FR | 2934908 | 2/2010 | G06F 3/02 |
| JP | 3220405 | 10/2001 | |
| TW | 200506480 | 2/2005 | G02F 1/21 |
| TW | 200533591 | 10/2005 | B81B 7/02 |
| TW | 200624974 | 7/2006 | G02F 1/21 |
| TW | 200627041 | 8/2006 | G02F 1/21 |
| TW | 200939097 | 9/2009 | |
| TW | 201007090 | 2/2010 | B81B 7/02 |
| TW | 201017306 | 5/2010 | G02F 1/21 |
| TW | 201024203 | 7/2010 | B81B 7/02 |
| TW | 201044241 | 12/2010 | G06F 3/041 |
| TW | M393740 | 12/2010 | G06F 3/044 |

OTHER PUBLICATIONS

Office Action issued in related U.S. Appl. No. 13/336,355, dated Aug. 30, 2013 (19 pgs).
Office Action issued in related U.S. Appl. No. 13/336,721, dated Sep. 5, 2013 (21 pgs).
Taiwanese Office Action (no translation) issued in related application No. 100117825, dated Mar. 17, 2014 (14 pgs).
Taiwanese Office Action (no translation) issued in related application No. 100103923, dated Apr. 25, 2014 (5 pgs).
Chinese Office Action (no translation) issued in related application No. 201210159628.7, dated Jun. 4, 2014 (14 pgs).
French Preliminary Search Report (no translation) issued in related application No. 1161837, dated Dec. 9, 2013 (10 pgs).

* cited by examiner

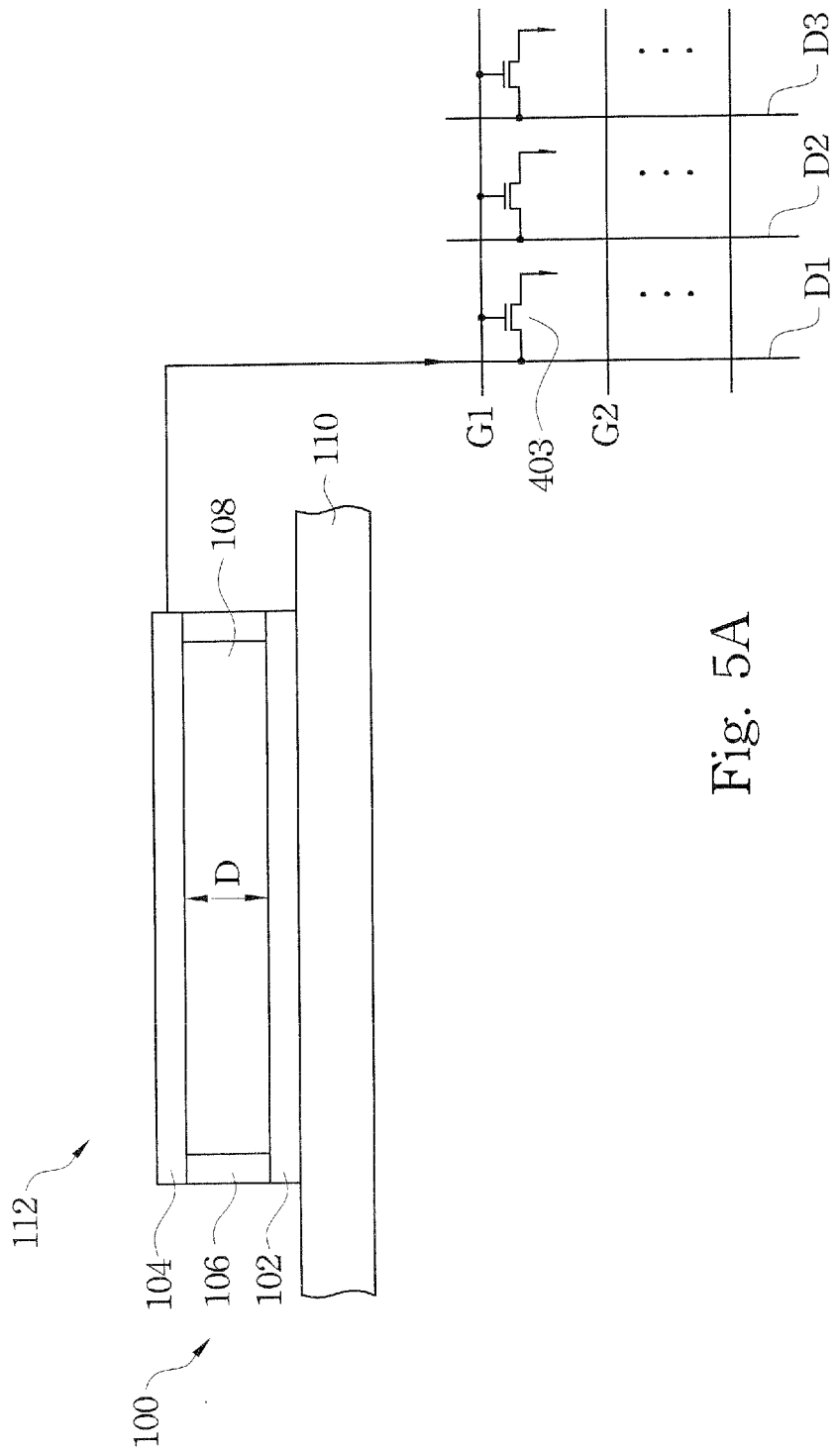

MEMS DISPLAY WITH TOUCH CONTROL FUNCTION

RELATED APPLICATIONS

This application is a continuation-in-part of U.S. application Ser. No. 13/328,067, filed Dec. 16, 2011, which claims priority to Taiwan Application Serial Number 099144256, filed Dec. 16, 2010, currently pending, and a continuation-in-part of U.S. application Ser. No. 13/336,721, filed Dec. 23, 2011 now abandoned, which claims priority to Taiwan Application Serial Number 099147434, filed Dec. 31, 2010, currently pending. The present application is also based on, and claims priority from Taiwan Application Serial Number 100117825 filed May 20, 2011. All of these applications are incorporated herein by this reference.

BACKGROUND

1. Field of Invention

The present invention relates to a display system. More particularly, the present invention relates to a display system with touch control function.

2. Description of Related Art

Due to being lightweight and small in size, a display panel is favorable in the market of portable displays and displays with space limitations. To date, the liquid crystal display (LCD) has been assembled in many electronic apparatus. However, the typical liquid crystal display needs a backlight source to illuminate the liquid crystal molecules to display images, which will consume a lot of power. Moreover, the backlight source also increases the thickness of the liquid crystal display.

A new display system using microelectromechanical system, MEMS, is developed. MEMS devices generally range in micrometers size. Therefore, the volume of the display system using microelectromechanical system is small. Moreover, this kind of display system displays images by reflecting the environment light. It is not necessary to assemble a backlight source in the display system, which can save much power. Therefore, such display system is very fit to dispose in a portable device.

Accordingly, how to improve the operation convenience of the display system using microelectromechanical system is required.

SUMMARY

An object of the present invention is to provide a display system using microelectromechanical system (MEMS) that may be controlled by a touch control system.

Accordingly, a display system using microelectromechanical system (MEMS) is disclosed. The display system includes a first substrate, a touch control unit and a plurality of MEMS display units. The first substrate has a control array. The MEMS display units are disposed in the first substrate. The control array controls the MEMS display units.

In an embodiment, the MEMS display units are optical interference display units, wherein each of the optical interference display unit has a single cavity or a plurality of cavities.

In an embodiment, a cover lens disposed over the optical interference display units, the touch control unit is disposed on the cover lens, or disposed between the cover lens and the optical interference display units.

In an embodiment, each of the optical interference display units further comprises: a first electrode formed on the first substrate; a second electrode formed over the first electrode; and a post disposed between the first electrode and the second electrode to support the second electrode, a cavity is formed between the first electrode and the second electrode; wherein the control array moves the second electrode related to the first electrode.

In an embodiment, the MEMS display units are micro-lens apparatus, the micro-lens apparatus includes a plurality of micro-lens arranged in array and located on the first substrate, wherein each of the micro-lens includes a mirror and at least two control electrodes. The control array controls tilt angle, and tilt direction of the micro-lens, wherein the tilt angle is between −25 degrees to +25 degrees.

In an embodiment, further comprises a cover lens disposed over the micro-lens apparatus, wherein the touch control unit is disposed on the cover lens, or disposed between the cover lens and the micro-lens apparatus.

In an embodiment, further comprises a color filter disposed over the MEMS display units, and a cover lens disposed over the color filter, wherein the touch control unit is disposed on the cover lens, or disposed between the cover lens and the color filter, or disposed between the color filter and the MEMS display units.

In an embodiment, the touch control unit detects a touch position by a resistive touch sensing technology, an electromagnetic touch sensing technology, a capacitive touch sensing technology, an optical sensing technology, an Ultrasonic sensing technology, a pressure sensing technology, a Surface acoustic wave sensing technology or any combination of the above.

In an embodiment, a front light source is disposed over the MEMS display units, wherein the front light source is a white light source or comprises a plurality of color light source. The touch sensing process is performed on the MEMS display units when the front light source is turned off. The touch control unit is disposed over the front light source.

In an embodiment, the touch control unit includes a sensor, a first selective unit, a second selective unit, a first control unit, a second control unit, first conductive lines and second conductive lines. The first conductive lines are arranged in a first direction. Each first conductive line has a first end and a second end. The first end couples with the first control unit and the second end couples with the first selective unit. Second conductive lines are arranged in a second direction. Each second conductive line has a first end and a second end, the first end couples with the second control unit and the second end couples with the second selective unit.

In an embodiment, when the touch control unit performs an electromagnetic touch sensing technology, the first control unit connects the first end of each of the first conductive lines to a first transmission line and the first selective unit sequentially connects the second ends of the first conductive lines based on an order to form sensing loops in the first direction; the second control unit connects the first end of each of the second conductive lines to a second transmission line, the second selective unit sequentially connects the second end of the second conductive lines based on an order to form sensing loops in the second direction; and a first sensing method is performed to sense the magnetic flux, electromagnetic induction, current or frequency of sensing loops to determine, distance, height, strength, a touch position or a touch strength.

In an embodiment, further comprising: grouping the first conductive lines and the second conductive lines, wherein each group includes at least two first conductive lines, or at least two second conductive lines; the first selective unit sequentially connects the second ends of the first conductive lines in each group based on an order to form sensing loops in the first direction; the second selective unit sequentially connects the second end of the second conductive lines in each group based on an order to form sensing loops in the second direction; transferring a sensing signal to the sensing loops; and performing the first sensing method to sense the magnetic flux, electromagnetic induction, current or frequency of sensing loops to determine, distance, height, strength, a touch position or a touch strength.

In an embodiment, the first sensing method is to transfer a sensing signal with a special frequency to the sensing loops to sense the magnetic flux, electromagnetic induction, current or frequency of the sensing loops, wherein the sensor determine whether or not the magnetic flux, electromagnetic induction, current or frequency of the sensing loops are changed.

In an embodiment, when touch control unit performs a capacitive touch sensing technology, the first control unit disconnects the connection between the first end of each of the first conductive lines and a first transmission line, and the second control unit disconnects the connection between the first end of each of the second conductive lines and a second transmission line, and a second sensing method is performed to sense the capacitance, current or voltage to determine, distance, height, strength, a touch position or a touch strength.

In an embodiment, further comprising: grouping the first conductive lines and the second conductive lines, wherein each group includes at least two first conductive lines, or at least two second conductive lines; transferring a sensing signal to each group; and performing the second sensing method to sense the capacitance, current or voltage to determine a touch position or a touch strength of each group to determine distance, height, strength, a touch position or a touch strength.

In an embodiment, the second sensing method is the sensor transfers a sensing signal through the first selective unit to the first conductive lines, and transfers a sensing signal through the second selective unit to the second conductive lines to sense the change of the capacitance, current or voltage of the first conductive lines and the second conductive lines to determine distance, height, strength, a touch position or a touch strength.

In an embodiment, the second sensing method is the sensor transfers a sensing signal through the first selective unit to the first conductive lines, and through the second selective unit to sense the capacitance, current or voltage of the second conductive lines to determine distance, height, strength, a touch position or a touch strength.

In an embodiment, the first control unit includes a control line and a plurality of switches or a plurality of switches in series coupling with the first conductive lines, wherein the sensor controls the control line to turn on the switches to make the first end of each of the first conductive lines connect to a first transmission line, and the sensor controls the control line to turn off the switches to disconnect the connection between the first end of each of the first conductive lines and the first transmission line.

In an embodiment, the second control unit includes a control line and a plurality of switches or a plurality of switches in series coupling with the second conductive lines, wherein the sensor controls the control line to turn on the switches to make the first end of each of the second conductive lines connect to a second transmission line, and the sensor controls the control line to turn off the switches to disconnect the connection between the first end of each of the second conductive lines and the second transmission line.

Accordingly, a touch sensor is integrated into the MEMS display system. Therefore, a user can use the touch panel to control the MEMS display system, which is convenience for the user. Moreover, the data lines D1, D2 . . . Dm and the scan lines G1, G2, . . . , Gn can be used to serve as the electrode of the dual-mode touch sensor of the present invention. Accordingly, it is not necessary to form additional electrodes for sensing the touch position. Therefore, the production cost is reduced and the production yield is kept.

BRIEF DESCRIPTION OF THE DRAWINGS

In order to make the foregoing as well as other aspects, features, advantages, and embodiments of the present invention more apparent, the accompanying drawings are described as follows:

FIG. 5A illustrates a schematic diagram of a connection structure between an optical interference display panel and a control unit according to a preferred embodiment of the present invention.

DETAILED DESCRIPTION

Figure 1:
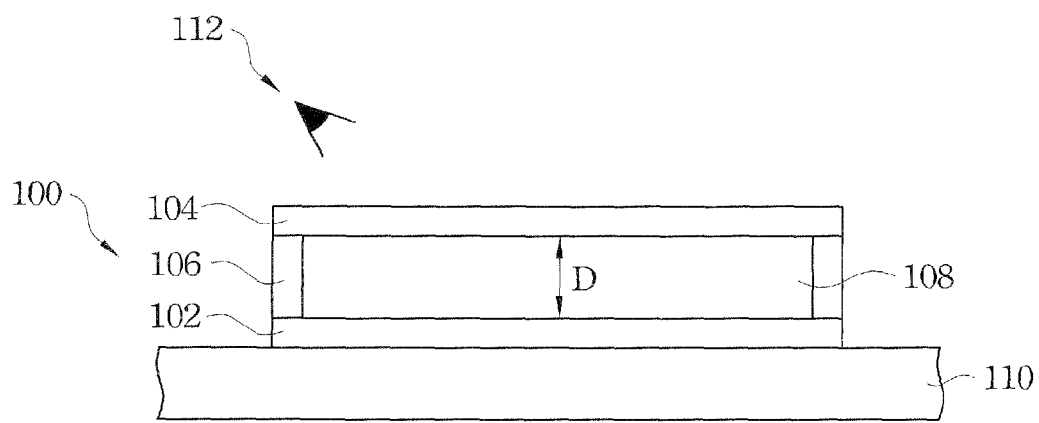
FIG. 1 illustrates a cross section view of an optical interference display panel according to a preferred embodiment of the present invention.

Reference will now be made in detail to the present embodiments of the invention, examples of which are illustrated in the accompanying drawings. Wherever possible, the same reference numbers are used in the drawings and the description to refer to the same or like parts.

Regarding the developing of display technology, novel displays have been used in many types of portable device, such as a notebooks, a mobile phones, a digital camera and other electronic product. For avoiding these portable devices too heavy, the input apparatus have been changed from keyboards to touch panel.

Typically, many sensing control technologies are used in touch panel including resistive touch sensing technology, electromagnetic touch sensing technology, capacitive touch sensing technology, optical sensing technology, Ultrasonic sensing technology, pressure sensing technology, Surface acoustic wave sensing technology and so on. A resistive touchscreen panel comprises several layers, these layers face each other, with a thin gap between. One layer has conductive connections along its sides, the other along top and bottom. a voltage is passed through one layer, and sensed at the other. When an object, such as a fingertip or stylus tip, presses down on the outer surface, the two layers touch to become connected at that point: The panel then behaves as a pair of voltage dividers, one axis at a time. By rapidly switching between each layer, the position of a pressure on the screen can be read. Surface acoustic wave (SAW) technology uses ultrasonic waves that pass over the touchscreen panel. When the panel is touched, a portion of the wave is absorbed. This change in the ultrasonic waves registers the position of the touch event and sends this information to the controller for processing. In this Surface capacitance technology, only one side of the insulator is coated with a conductive layer. A small voltage is applied to the layer, resulting in a uniform electrostatic field. When a conductor, such as a human finger, touches the uncoated surface, a capacitor is dynamically formed. The sensor's controller can determine the location of the touch indirectly from the change in the capacitance as measured from the four corners of the panel. Projected Capacitive Touch (PCT) (also PCAP) technology is a variant of capacitive touch technology. All PCT touch screens are made up of a matrix of rows and columns of conductive material, layered on sheet of glass. Current applied to this grid creates a uniform electrostatic field, which can be measured. When a conductive object, such as a finger, comes into contact with a PCT panel, it distorts the local electrostatic field at that point. This is measurable as a change in capacitance. If a finger bridges the gap between two of the "tracks", the charge field is further interrupted and detected by the controller. The capacitance can be changed and measured at every individual point on the grid (intersection). Therefore, this system is able to accurately track touches. On the other hand, a sensor board using the electromagnetic sensing technology includes a substrate with an antenna array, a control circuit for calculating the touch position and a sensing pen. The sensing pen is a transceiver and the substrate with the antenna array is a receiver. When a user uses the sensing pen to touch the electronic paper display, magnetic flux is changed. A microcontroller can detect the change of the magnetic flux to calculate the touch position.

Microelectromechanical system (MEMS) display system is a flat panel including optical interference display panel and micro-mirror array display panel. The present invention is related to a MEMS display system. An optical interference display panel is sued to explain the present invention in the following embodiments.

FIG. 1 illustrates a cross section view of an optical interference display panel according to a preferred embodiment of the present invention. Every optical interference display unit 100 comprises a substrate 110 and two electrodes, a first electrode 102 and a second electrode 104, formed on the substrate 100. The first electrode 102 and the second electrode 104 are supported by posts 106 to form a cavity 108. The distance between the first electrode 102 and the second electrode 104 is the depth D of cavity 108. The second electrode 104 is a light-incident electrode that is deformation by applying an electrical field on it. The first electrode 102 is a light-reflection electrode that is flexed when a voltage is applied to it.

When the incident light shines through the second electrode 104 and arrives at the cavity 108, only the visible light with wavelengths corresponding to the formula 1.1 is reflected back, that is, $$2D = N\lambda \quad (1.1)$$

wherein N is a natural number. When the depth of the cavity 108, D, equals one certain wavelength $\lambda_1$ of the incident light multiplied by any natural number, N, a constructive interference is produced, and a light with the wavelength $\lambda_1$ is reflected back. Thus, an observer 112 viewing the panel from the direction of the incident light will observe light with the certain wavelength $\lambda_1$ reflected back at him. The optical interference display unit 100 here is in an "open" state.

Figure 2:
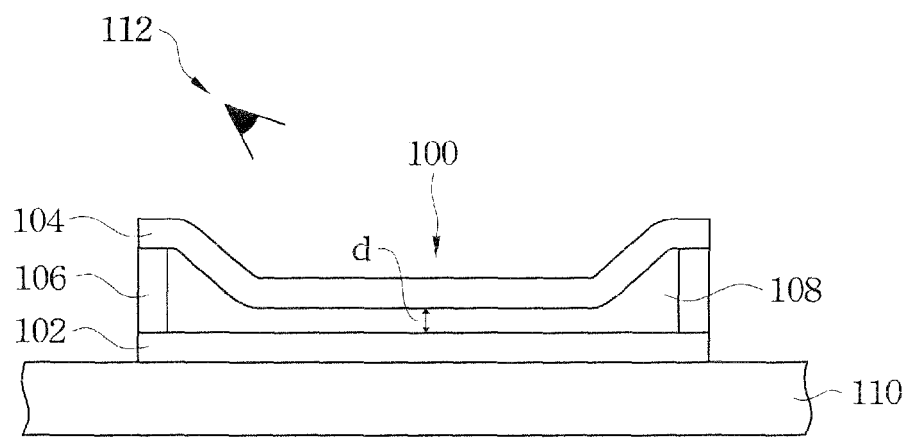
FIG. 2 illustrates a cross section view of applying a voltage to an optical interference display panel that according to a preferred embodiment of the present invention.

FIG. 2 illustrates a cross section view of applying a voltage to an optical interference display panel that according to a preferred embodiment of the present invention. Under the applied voltage, the second electrode 104 is flexed by electrostatic attraction toward the first electrode 102. At this moment, the distance between the first electrode 102 and the second electrode 104, the depth of cavity 108, becomes d and may equal zero.

The D in the formula 1.1 is hence replaced with d, and only the visible light with another certain wavelength $\lambda_2$ satisfying the formula 1.1 produces a constructive interference and reflects back through the first electrode 102. However, in the optical interference display unit 100, the first electrode 102 is designed to have a high absorption rate for the light with the wavelength $\lambda_2$. Thus, the incident visible light with the wavelength $\lambda_2$ is absorbed, and the light with other wavelengths has destructive interference. All light is thereby filtered, and the observer 112 is unable to see any reflected (or transmissive) visible light when the second electrode 104 is flexed. The optical interference display unit 100 is now in a "closed" state, i.e. a dark state.

As described above, under the applied voltage, the second electrode 104 is flexed by electrostatic attraction toward the first electrode 102, such that the optical interference display unit 100 is switched from the "open" state to the "closed" state. When the optical interference display unit 100 is switched from the "closed" state to the "open" state, the voltage for flexing the second electrode 104 is removed, and the second electrode 104 elastically returns to the original state, i.e. the "open" state or light state, as illustrated in FIG. 1. The material of the substrate 110 is glass. The material of the first electrode 102 and the second electrode 104 is ITO or IZO. The first electrode 102 is a membrane, typically made of metal. Because the light is interfered by the depth of the cavity 108 to display different color, the color and the brightness of the light may be controlled by changing the depth of the cavity 108. Moreover, by changing the switching frequency of the optical interference display unit 100, a gray level is represented by the optical interference display unit 100.

Figure 3:
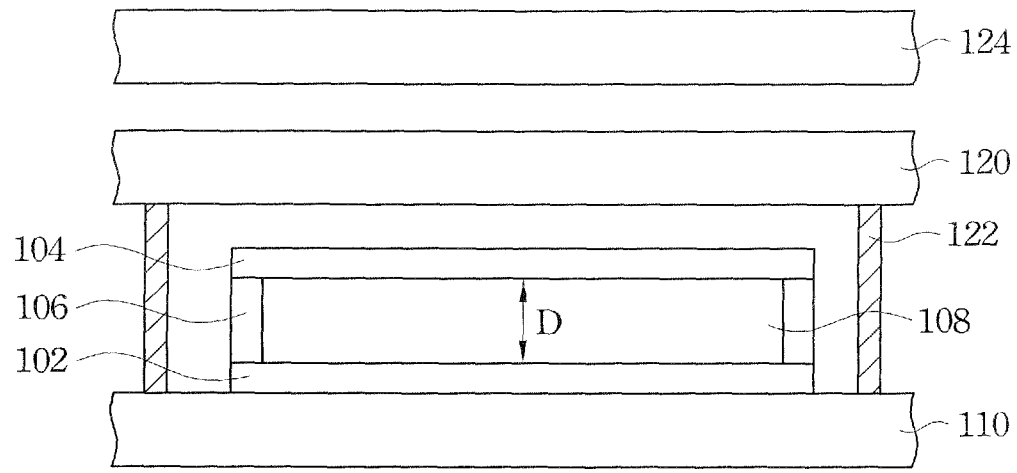
FIG. 3 illustrates a cross section view of an optical interference display panel with a protection cover that according to a preferred embodiment of the present invention.

FIG. 3 illustrates a cross section view of an optical interference display panel with a protection cover that according to a preferred embodiment of the present invention. For protecting the optical interference display unit 100, a flat protection structure 120 is adhered to the substrate 110 with an adhesive 122 to form a "⊓" sharp. The substrate 110 is a glass substrate or a substrate transparent to visible light. Moreover, a second substrate 124 is selectively formed over the protection structure 120 to serve as an upper cover. The second substrate 124 and the flat protection structure 120 reduce the possibility that an external force reaches the optical interference display unit 100. Moreover, the adhesive 108 seals the optical interference display unit 100 between the substrate 110 and the second substrate 124 and the flat protection structure 120. The adhesive 108 is used to isolate the optical interference display unit 100 from an external environment and prevent it from being damaged by water, dust and oxygen in the air. A pattern can be formed in the second substrate 124 to beautify the display.

Figure 4:
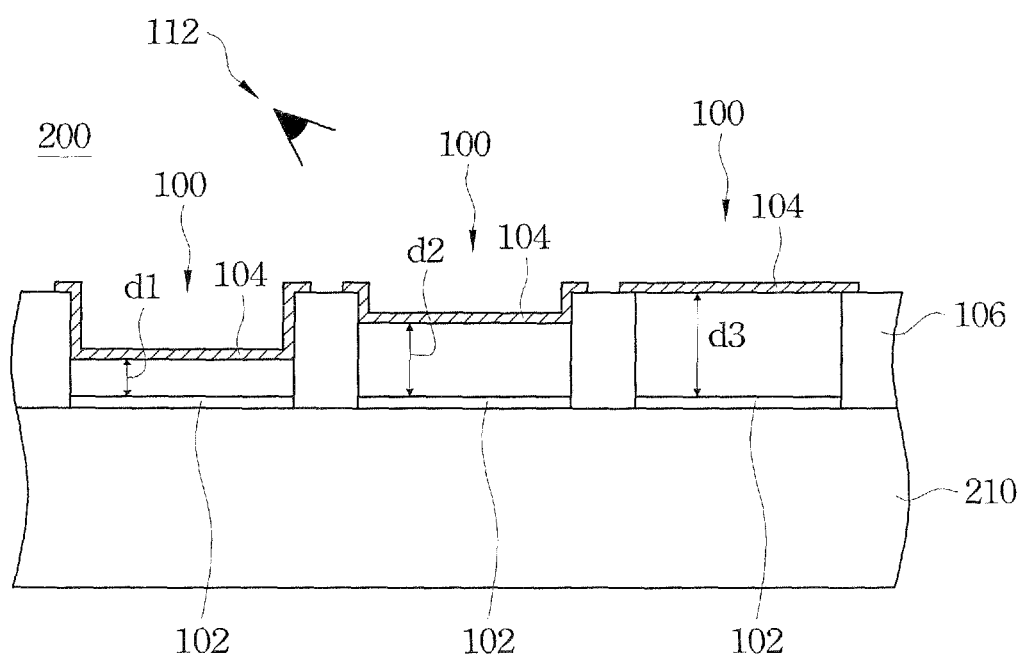
FIG. 4 illustrates a cross section view of a color optical interference display panel according to a preferred embodiment of the present invention.

In another embodiment, for color displaying, an optical interference display unit 200 comprises three display units with different cavity lengths to create different interference for incident light. FIG. 4 illustrates a cross section view of a color optical interference display unit according to a preferred embodiment of the present invention. Each color optical interference display unit 200 is composed of three optical interference display units 100. Every optical interference display unit 100 comprises a substrate 110, a post 106 and two electrodes, a first electrode 102 and a second electrode 104, formed on the substrate 100. The material of the substrate 110 is glass. The post 106 is formed on the substrate 110 to support the second electrode 104. The first electrode 102 is disposed on the substrate 110 and is a transparent electrode. An absorption layer (not shown in the Fig.) is disposed under the first electrode 102 or under the substrate.

The second electrode 104 is disposed over the first electrode 102 and is supported by the post 106. The second electrode 104 is a transparent electrode, too, and is made by Indium Tin Oxide (ITO), Carbon nanotubes or IZO. As shown in FIG. 4, the color optical interference display unit 200 comprises three optical interference display units 100 with different cavity depth, d1, d2 and d3, to create different interference for incident light. For example, the cavity with cavity depth d1 may display blue light. The cavity with cavity depth d2 may display green light. The cavity with cavity depth d3 may display red light. In another embodiment, the cavity depth, d1, d2 and d3 may display cyan color light, magenta color light, and yellow color light respectively.

In other words, an incident light passing through the second electrode 104 and the cavity to illuminate the second electrode 102 is reflected by first electrode 102. The wavelengths of the reflected light are different, for example, they are red light, green light and blue light. The reason to have reflected light with three different wavelengths is that the depths of the cavities of optical interference display units 100 are different. An observer 112 can see different color. Moreover, a voltage is applied to the optical interference display units 100 to make the second electrode 104 flex to close to the first electrode 102. The cavity depths, d1, d2 and d3, are changed to create a Desstructive Inteference. An observer 112 is unable to see any reflected visible light. The color optical interference display unit 200 is now in a "closed" state, i.e. a dark state. Moreover, for protecting the color optical interference display unit 200, a protection unit, such as a second substrate 124 serving as an upper cover as illustrated in FIG. 3, may be formed over the color optical interference display unit 200. In this embodiment, a circuit pattern of touch panel can be formed in the second substrate 124.

For switching the states between an "open" state and a "closed" state of the optical interference display unit 100, an active array including a plurality of control units is formed in the substrate 110. Each optical interference display unit 100 is controlled by a corresponding control unit to form a pixel. Each control unit includes a thin film transistor, a CMOS or a switch and couples with a corresponding optical interference display unit 100 to control its state, an "open" state or a "closed" state. When a control unit wants to control a corresponding optical interference display unit 100 in a "closed" state, this control unit will apply a voltage to the optical interference display unit 100 to make the second electrode 104 flex to close to the first electrode 102. An observer 112 is unable to see any reflected visible light. The optical interference display unit 100 is now in a "closed" state. In contrary, when a control unit wants to control a corresponding optical interference display unit 100 in a "open" state, this control unit does not apply any voltage to the optical interference display unit 100. The incident light passes through the first electrode 102. An observer 112 can see the visible light. The optical interference display unit 100 is now in a "open" state.

Accordingly, when the three optical interference display units 100 of a color optical interference display unit 200 are controlled by three control units respectively, the three control units may change the cavity depths d1, d2 and d3 respectively to make the three optical interference display units 100 to display three different color lights. By mixing the three different color lights, the observer 112 can see a full color display. In another embodiment, the color optical interference display unit 200 can be composed by three optical interference display units 100 that can display cyan color, prunus color and yellow color.

In an embodiment, a conductive electrode structure of a touch panel can be integrated into a conductive electrode structure of a MEMS display system. The conductive electrode structure of a MEMS display system is the scan lines, the data lines, the bias lines, the power lines, the common lines, the reading lines, the control lines, the buffer lines, the auxiliary lines or the signal lines. In the following embodiment, the scan lines and the data lines of an optical interference display unit is used as the conductive electrode structure of a touch panel. It is noticed that the present invention can be also applied to other MEMS display system, such as a Micro Mirror Array. When the present invention is applied to a Micro Mirror Array, a conductive electrode structure of a touch panel is integrated into the electrode structure of a pixel array of the Micro Mirror Array.

FIG. 5A illustrates a schematic diagram of a connection structure between an optical interference display panel and a control unit according to a preferred embodiment of the present invention. In this embodiment, an active array formed in a first substrate 110 is used to form the electrode structure of the control unit. The electrode structure includes a plurality of data lines D1~Dm and a plurality of scan lines G1~Gn. Each pair of the data line and the scan line controls a pixel. For example, the data line D1 and the scan line G1 control the pixel 402. Each pixel includes a thin film transistor 403 coupling with a corresponding optical interference display unit 100 to switch its state. In an embodiment, the first electrode 102 couples with a common electrode and the second electrode 104 couples with the thin film transistor 403. When the scan signal selects the scan line G1, the thin film transistor 403 is turned on. The data signal transferred in the data line D1 controls the movement, deformation, vibration or rotation of the second electrode 104 in the cavity 108 through the thin film transistor 403 so that the state of the optical interference display unit 100 is controlled. The sensor is also deposed in the substrate 110. In other embodiment, the first electrode 102 couples with the thin film transistor 403 and the second electrode 104 couples with a common electrode. Similarly, the Micro Mirror Array has the same control structure.

Figure 5B:
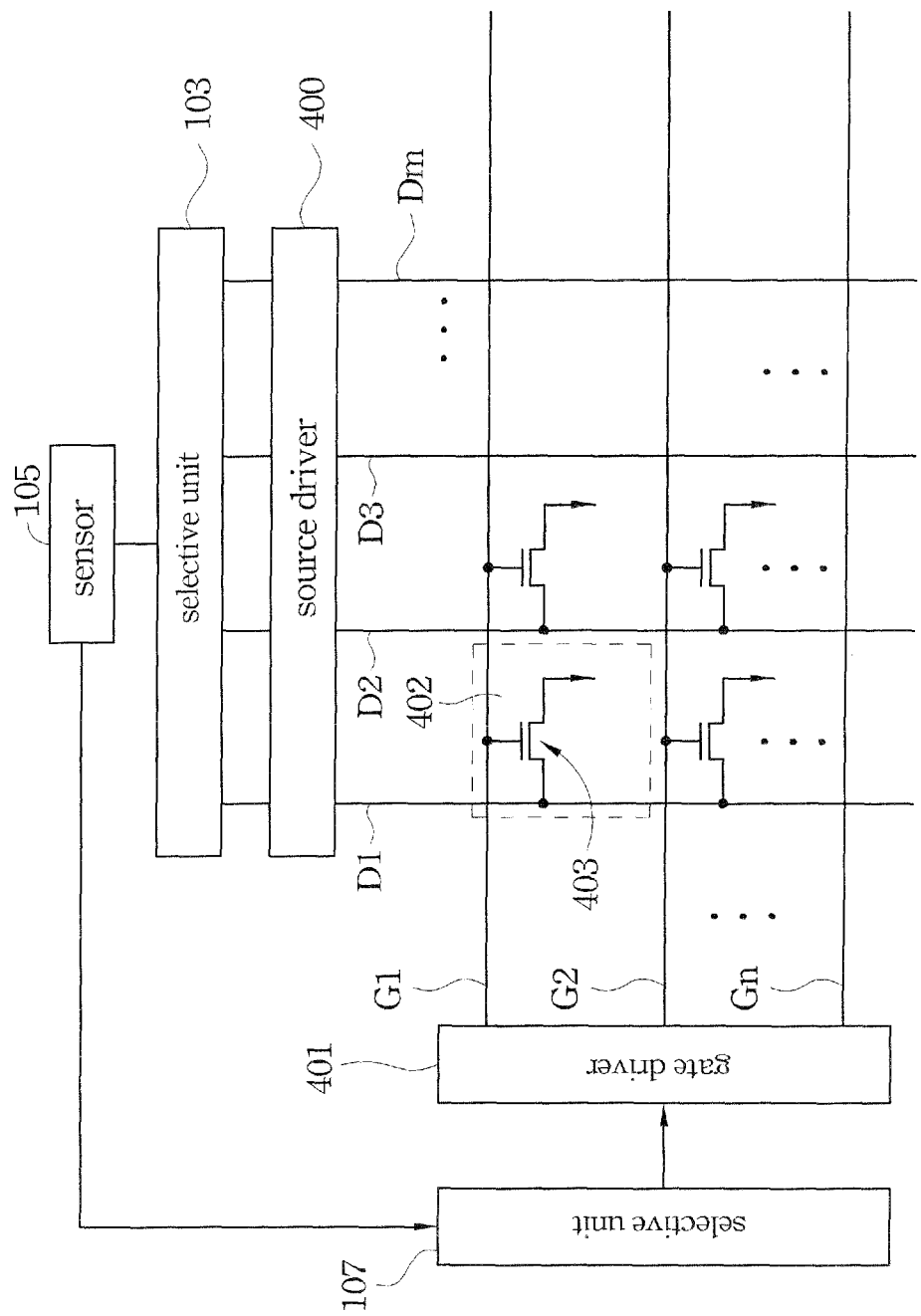
FIG. 5B illustrates a schematic diagram of an electrode structure of an optical interference display panel according to a preferred embodiment of the present invention.

FIG. 5B illustrates a schematic diagram of an electrode structure of an optical interference display panel according to a preferred embodiment of the present invention. The electrode structure of a touch panel includes a plurality of data lines D1~Dm and a plurality of scan lines G1~Gn of an active array. Therefore, it is not necessary to change the electrode structure of this active array. Accordingly, a sensing region is formed by the data lines D1 and D2 and the scan lines G1 and G2. For preventing a sensing process interfere with the image display, a selective unit 103 is sued to control the connection between the sensor 105 and the data lines D1~Dm. A selective unit 107 is sued to control the connection between the sensor 105 and the scan lines G1~Gn. Moreover, the image signal and the sensing signal are transferred to the data lines D1, D2 . . . Dm and the scan lines G1, G2, . . . , Gn in different times. That is, when the image signal is transferred to the data lines D1, D2 . . . Dm to display, there is no any sensing signal is transferred in the data lines D1, D2 . . . Dm. Therefore, the image signal can be displayed normally.

When the data signal is transferred in the data lines D1~Dm and the scan signal is transferred in the scan lines G1~Gn, the selective units 103 and 107 disconnect the connection among the data lines D1, D2 . . . Dm and among the scan lines G1, G2, . . . , Gn. In contrary, when a sensing process is performed by the sensor 105, the selective units 103 and 107 connect the data lines D1, D2 . . . Dm and the scan lines G1, G2, . . . , Gn to form sensing loop. Then, the sensor 105 senses the touch position using resistive touch sensing is technology, electromagnetic touch sensing technology, capacitive touch sensing technology, optical sensing technology, Ultrasonic sensing technology, pressure sensing technology, Surface acoustic wave sensing technology and so on. The sensor 105 senses, detects and excites the data lines selected by the selective unit 103. The sensor 105 also senses, detects and excites the scan lines selected by the selective unit 107.

For example, the sensor 105 senses the touch position using a capacitive touch sensing technology. Typically, there are two types of the capacitive touch sensing technology. One is self-capacitance touch sensing technology. The other is Mutual-capacitance touch sensing technology. According to the self-capacitance touch sensing technology, the sensor 105 control the selective units 103 and 107 to select the data lines and the scan lines. Then, the sensor 105 sends sensing signal to the selected data lines D1, D2 . . . Dm and the scan lines G1, G2, . . . , Gn to determine the position whose capacitance is changed. Then, the sensor 105 can calculate the touching position based on the change of the capacitance. On the other hand, when the mutual-capacitance touch sensing technology is performed to sense the touch position, the sensor 105 sends sensing signal to the data lines D1, D2 . . . Dm through the selective unit 103 and receives the sensing signal from the scan lines G1, G2, . . . , Gn through the selective unit 107 to determine the position whose capacitance is changed. Or, the sensor 105 sends sensing signal to the scan lines G1, G2, . . . , Gn through the selective unit 107 and receives the sensing signal from the data lines D1, D2 . . . Dm through the selective unit 103 to determine the position whose capacitance is changed. Then, the sensor 105 can calculate the touching position based on the change of the capacitance. It is noticed that the foregoing sensing method can be also used in resistive sensing technology, pressure sensing technology or optical sensing technology.

When an electromagnetic touch sensing technology is performed by the sensor 105, the sensor 105 controls the selective unit 103 to select some of data lines D1, D2 . . . Dm to form a sensing loops. The sensor 105 sends sensing signal through the selective unit 103 to the sensing loop to determine the touch position. On the other hand, the sensor 105 also controls the selective unit 107 to select some of scan lines G1~Gn to form a sensing loops. The sensor 105 sends sensing signal through the selective unit 107 to the sensing loop to determine the touch position. In an embodiment, the sensing loop includes adjacent two data lines or scan lines. In another embodiment, the sensing loop includes separated data lines or scan lines. In further embodiment, the sensing loop includes multi-lines. Moreover, the sensing loops are formed sequentially or are formed in a same time. The sensor 105 detects the sensing loops to determine whether or not the sensing signal in the detected loops is changed. In an embodiment, the sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

Figure 5C:
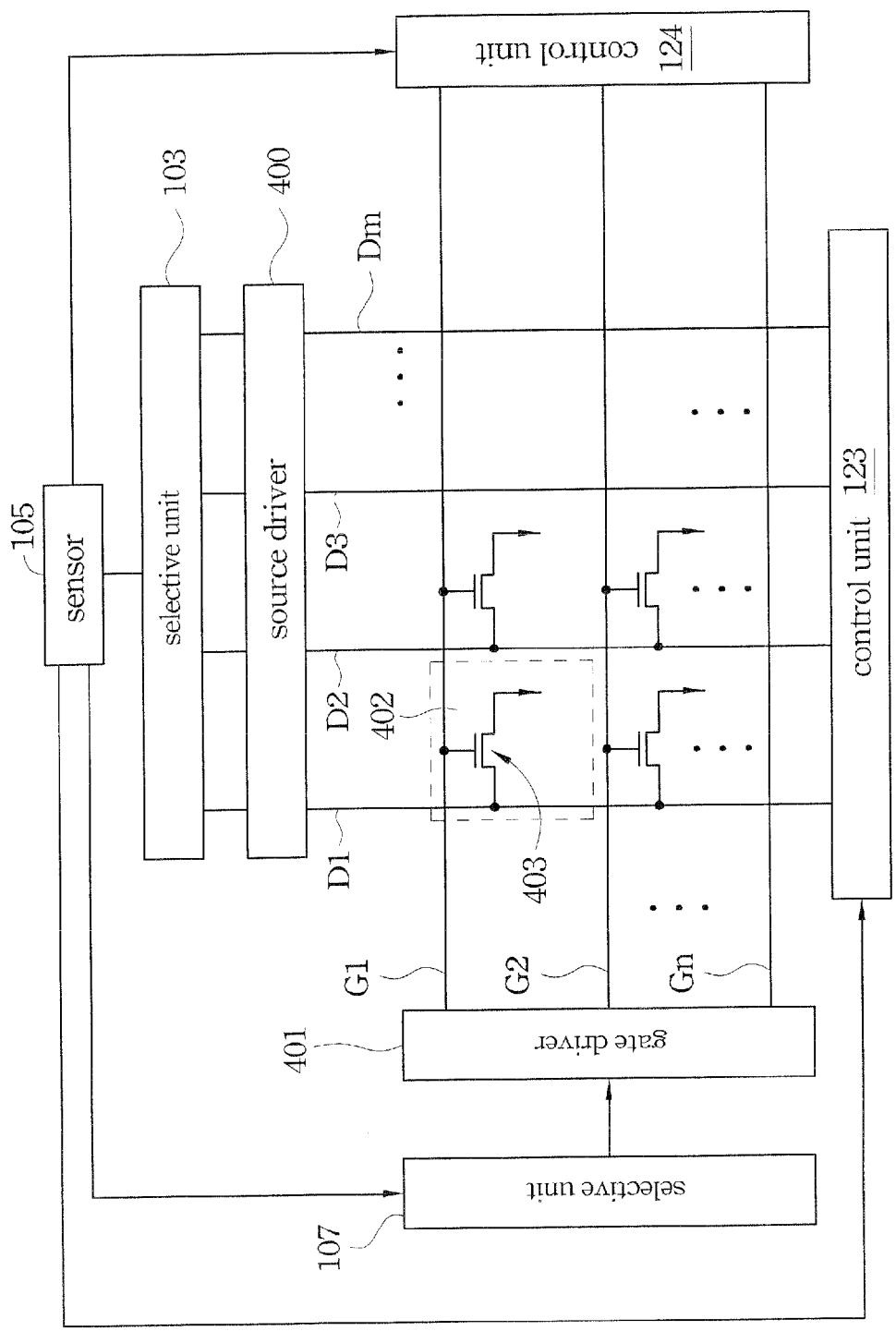
FIG. 5C illustrates a schematic diagram of an touch device of an optical interference display panel according to a preferred embodiment of the present invention.

FIG. 5C illustrates a schematic diagram of a touch device of an optical interference display panel according to a preferred embodiment of the present invention. The touch device can perform a dual-mode touch sensing process. An active array of the optical interference display unit 100 is composed of a plurality of data lines D1, D2 . . . Dm and a plurality of scan lines G1, G2, . . . , Gn. The data lines cross the scan lines. Each pair of data lines and scan line controls a pixel unit. For example, the data line D1 and the scan line G1 controls a pixel unit 402. Each pixel unit 402 includes a thin film transistor 403 coupling with a corresponding optical interference display unit 100 to switch its state, a "closed" state or an "open" state. The scan signal in the scan line transferred by the gate driver 401 may turn on the thin film transistor 403. Then, the image signal in the data line D1 transferred by the source driver 400 is transferred to the pixel unit 402 and passes through the thin film transistor 403 to switch a state of a corresponding optical interference display unit 100 to display image. In an embodiment, the data lines D1~Dm and the scan lines G1~Gn have an included angle of 90 degrees. However, in another embodiments, the first direction and the second direction can have another included angle, such as 60 degrees, 45 degrees, 36 degrees or 30 degrees. The material for forming the data lines D1~Dm and the scan lines G1~Gn is metal, compound metal, Carbon Nanotubes, transparent conductor material, such as ITO, IZO. The data lines D1~Dm and the scan lines G1~Gn can be used to serve as the electrode of the dual-mode touch device of the present invention. Accordingly, it is not necessary to form additional electrodes for sensing the touch position. Therefore, the production cost is reduced and the production yield is kept. Accordingly, when an electromagnetic touch sensing technology is performed by the sensor 105, the sensor 105 controls the selective unit 103 to select data lines D1 and D20 to form a sensing loop and select scan lines G1 and G20 to form a sensing loop.

Moreover, to prevent the image signal from being interfered by the sensing signal, a control unit 123 and a selective unit 103 are formed between the data lines D1, D2 . . . Dm and the sensor 105 to control the connection between the data lines D1, D2 . . . Dm. A control unit 124 and a selective unit 107 are also formed between the scan lines G1~Gn and the sensor 105 to control the connection between the scan lines G1~Gn. Moreover, the image signal and the sensing signal are transferred to the data lines D1, D2 . . . Dm and the scan lines G1, G2, . . . , Gn in different times. That is, when the image signal is transferred to the data lines D1, D2 . . . Dm to display, the selective units 193 and 197 and the control units 123 and 124 disconnect the connection among the data lines D1~Dm and scan lines G1~Gn. That is, there is no any sensing signal transferred to the data lines and scan lines. Therefore, the image signal can be displayed normally. On the other hand, when an electromagnetic touch sensing technology is performed by the sensor 105, the sensor 105 controls the selective unit 103 and 107 and the control units 123 and 124 to select some of data lines D1~Dm and the scan lines G1~Gn to form sensing loops. The sensor 105 sends sensing signal through the selective units 103 and 107 to the sensing loops to determine the touch position.

In other words, displaying image and sensing process are performed in three different time segments. In the first time segment, the pixels in the display are scanned to display image. The selective units 103 and 107 and the sensor 105 do not work. In the second time segment, the electromagnetic touch sensing technology is performed. The selective units 103 and 104 select some of the data lines D1~Dm and some of the scan lines G1~Gn to form the sensing loops. The sensor 105 performs the electromagnetic touch sensing technology to determine the touch position. Then, in the third time segment, the capacitive touch sensing technology is performed. The sensor 105 senses the change of the capacitance between data lines D1~Dm and the scan lines G1~Gn to determine the touch position. The sensor 105 can calculate the touching position based on the change of the capacitance. It is noticed that the foregoing sensing method can be also used in resistive sensing technology, pressure sensing technology or optical sensing technology.

Figure 5D:
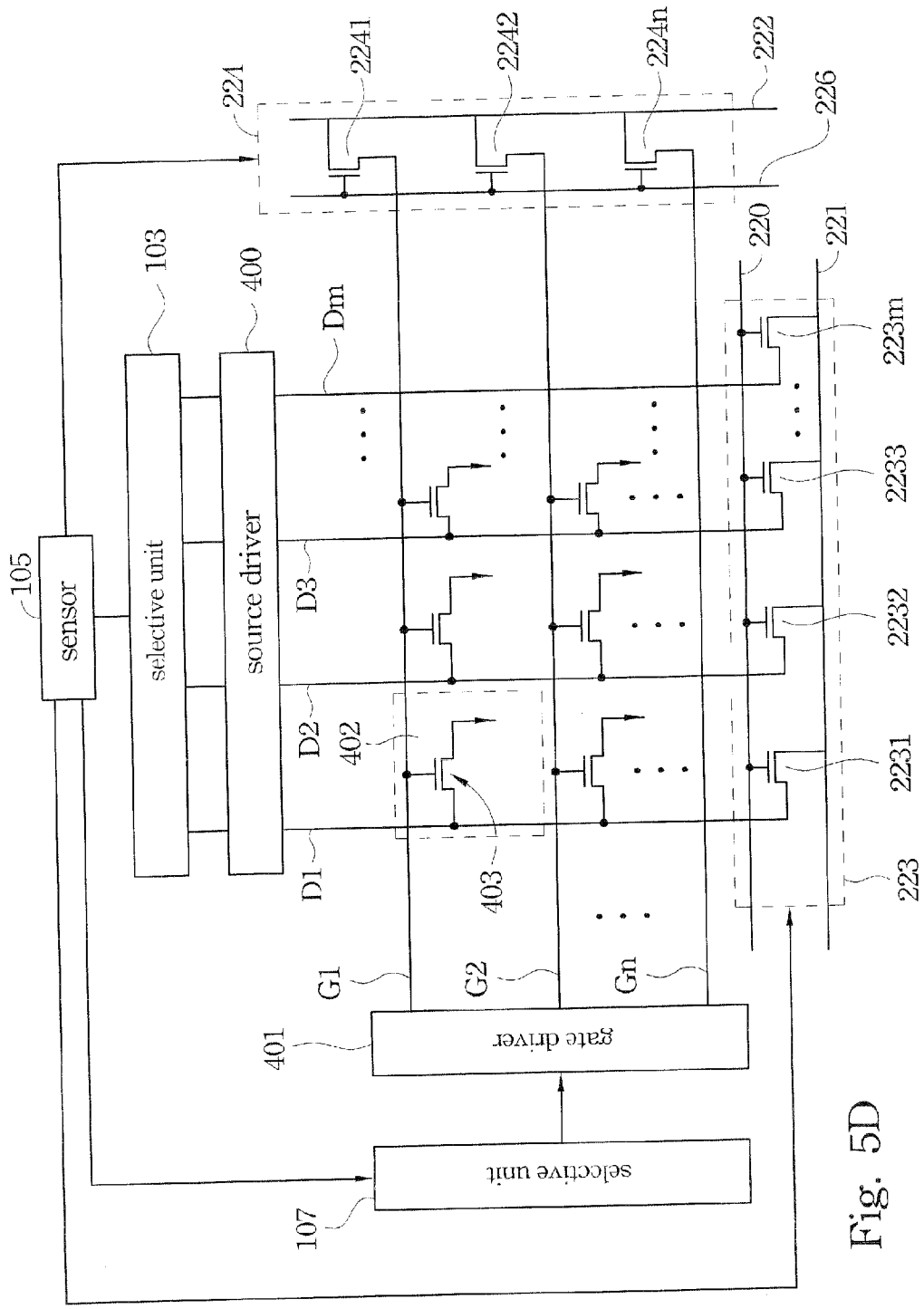
FIG. 5D illustrates a schematic diagram of an electrode structure of an optical interference display panel according to another embodiment of the present invention.

FIG. 5D illustrates a schematic diagram of an electrode structure of an optical interference display panel according to another embodiment of the present invention. Each of the selective units 103 and 107 includes a selective line and a transmission line. The switch, such as a thin film transistor, forms in the position that the selective line crosses the transmission line, the data lines D1~Dm and the scan lines G1~Gn are connected to the transmission line through the switches. In another embodiment, each of the selective units 103 and 107 includes a plurality of switches. By switching the switches, some of the data lines D1~Dm and some of the scan lines G1~Gn are connected together for forming sensing loops.

Moreover, to prevent the image signal from being interfered by the sensing signal, a control unit 223 is formed between the data lines D1, D2 . . . Dm and the transmission line 221 to control the connection between the data lines D1, D2 . . . Dm and the transmission line 221. Moreover, the image signal and the sensing signal are transferred to the data lines D1, D2 . . . Dm and the scan lines G1, G2, . . . , Gn in different times. That is, when the image signal is transferred to the data lines D1, D2 . . . Dm to display, there is no any sensing signal is transferred in the data lines D1, D2 . . . Dm. Therefore, the image signal can be displayed normally.

The control unit 223 includes a control line 220, a plurality of switch 2231~223m and a transmission line 221. The control line 220 switches the switches 2231~223m. The data lines D1, D2 . . . Dm are connected to the transmission line 221 through the switches 2231~223m. Therefore, the data lines D1, D2 . . . Dm can be connected together through the transmission line 221. In an embodiment, the switches 2231~223m are thin film transistors (TFT). The gate electrodes of the TFTs are connected to the control line 220. When the control line 220 controls the TFTs to an off state, the connection between the data lines D1, D2 . . . Dm and the transmission line 221 is disconnected. The display displays image. When the control line 220 controls the TFTs to an on state, the control line 220 turns on the switches 2231~123m to make the data lines D1, D2 . . . Dm connect with the transmission line 221 to form a sensing loop to perform an electromagnetic touch sensing technology.

On the other hand, a control unit 224 is formed between the scan lines G1, G2, . . . , Gn and the transmission line 222 to control the connection between the scan lines G1, G2, . . . , Gn and the transmission line 222. The control unit 224 includes a control line 226, a plurality of switch 2241~224n and a transmission line 222. The control line 226 switches the switches 2241~224n. The scan lines G1, G2, . . . , Gn are connected to the transmission line 222 through the switches 2241~224n. Therefore, the scan lines G1, G2, . . . , Gn can be connected together through the transmission line 222. In an embodiment, the switches 2241~1224n are thin film transistors (TFT). The gate electrodes of the TFTs are connected to the control line 226. When the control line 226 controls the TFTs to an off state, the connection between the scan lines G1, G2, . . . , Gn and the transmission line 222 is disconnected. When the control line 226 controls the TFTs to an on state, the control line 226 turns on the switches 2241~224n to make the scan lines G1, G2, . . . , Gn connect with the transmission line 222 to form a sensing loop to perform an electromagnetic touch sensing technology.

When a capacitive touch sensing technology is performed, the sensor 105 controls the control unit 223 to disconnect the connection among the data lines D1, D2 . . . Dm and controls the control unit 224 to disconnect the connection among the scan lines G1, G2, . . . , Gn. Next, the sensor 105 senses the touch position. Typically, there are two types of the capacitive touch sensing technology. One is self-capacitance touch sensing technology. The other is Mutual-capacitance touch sensing technology.

According to the self-capacitance touch sensing technology, capacitance exists between the data lines D1~Dm and the ground, and between the scan lines G1~Gn and the ground. When a finger touches the touch panel, the capacitance exists between the data lines D1~Dm and the ground, and between the scan lines G1~Gn and the ground is changed by this touch. By detecting the change, a touch position can be determined. Therefore, in the self-capacitance touch sensing technology, the sensor 105 control the selective units 103 and 107 to select some of the data lines D1, D2 . . . Dm and some of the scan lines G1, G2, . . . , Gn. Then, the sensor 105 sends sensing signal to the selected data lines D1, D2 . . . Dm and the selected scan lines G1, G2, . . . , Gn to determine the position whose capacitance is changed. The sensor 105 can calculate the touching position based on the change of the capacitance.

On the other hand, in the mutual-capacitance touch sensing technology, the sensing capacitors are formed in the positions where the data lines D1~Dm crossing the scan lines G1~Gn. That is, the data lines D1~Dm and the scan lines G1~Gn are electrodes of capacitors. When a finger touches the touch panel, the capacitance of the capacitor is changed. By detecting the change, a touch position can be determined. Therefore, when the mutual-capacitance touch sensing technology is performed, the sensor 105 sends sensing signal from the selective unit 103 to the data lines D1, D2 . . . Dm and receives the sensing signal from the scan lines G1, G2, . . . , Gn, or the sensor 105 sends sensing signal from the selective unit 107 to the scan lines G1, G2, . . . , Gn and receives the sensing signal from the data lines D1, D2 . . . Dm to determine the position whose capacitance is changed. Then, the sensor 105 can calculate the touching position based on the change of the capacitance. It is noticed that the foregoing sensing method can be also used in resistive sensing technology, pressure sensing technology or optical sensing technology.

When an electromagnetic touch sensing technology is performed, the sensor 105 controls the control unit 223 to connect the data lines D1, D2 ... Dm and controls the control unit 224 to connect the scan lines G1, G2, ..., Gn. Next, the sensor 105 controls the selective unit 103 to select some of the data lines D1 to form sensing loops, and controls the selective unit 107 to select some of the scan lines G1, G2, ..., Gn to form sensing loops. By detecting the sensing loops, a touch position is determined by the sensor 105. In an embodiment, the sensor 105 can determine whether or not the magnetic flux, electromagnetic induction, current or frequency is changed based on the sensing signal whether or not is changed. In an embodiment, the sensing signal is a square wave signal, a triangle wave signal, a like-triangle wave signal or a wave signal composed of a plurality of square wave signals. The change of the sensing signal includes the distorted of the wave, the change of the average value of the signal, the change of the peak value of the signal, the change of the current or the change of the voltage.

Moreover, because the data lines D1, D2 ... Dm and the scan lines G1, G2, ..., Gn are arranged in highly concentrated in the panel, when a user touch this panel, it is very possible for this user to touch many data lines and scan lines at same time. Such case may cause many positions whose capacitance are changed, which makes the sensor 105 can not determine the exactly touch position. For resolving this problem, a plurality of data lines, such as 30 data lines, are grouped together to serve as a touch line and a plurality of scan lines G1, G2, ..., Gn, such as 30 scan lines, are grouped together to serve as a touch line.

As shown in FIG. 5A, the data lines D1~D90 are grouped together to serve as a first touch line and the data lines D91~D180 are grouped together to serve as a second touch line. The rest may be deduced by analogy. The scan lines G1~G30 are grouped together to serve as a first touch line and the scan lines G31~G60 are grouped together to serve as a second touch line. The rest may be deduced by analogy. The sensing signal is transferred to the first touch line and the second touch line. In another embodiment, the grouped method is also according to the size of a finger, such as 2 mm~5 mm.

Furthermore, for forming sensing loops among the data lines D1, D2 ... Dm and the scan lines G1, G2, ..., Gn, two selective units 103 and 107 are formed on the display panel. The selective unit 103 connects some of the data lines D1, D2 ... Dm to form a sensing loop. The selective unit 107 also connects some of the scan lines G1, G2, ..., Gn, to form a sensing loop.

It is noticed that, the sensing loops can be formed by connecting two adjacent data lines D1, D2 ... Dm and formed by connecting two adjacent scan lines G1, G2, ..., Gn. However, in another embodiments, the sensing loops are formed by connecting separated data lines D1, D2 ... Dm and scan lines G1, G2, ..., Gn. For example, the sensor 105 controls the selective unit 103 to select data lines D1 and D30 to form the sensing loop. The sensing loops can be also formed by a first main line and a second main line connected with the first main line, wherein the first main line and the second main line are formed by connecting some data lines D1, D2 ... Dm or scan lines G1, G2, ..., Gn respectively. For example, the data lines D1~D20 are connected together through the transmission line 120 to be the first main line. The data lines D121~D140 are connected together through the transmission line 120 to be the second main line. Then, the first main line and the second main line are connected together to form a sensing loop. Accordingly, when the electromagnetic touch sensing technology is performed, the sensor 105 sends a sensing signal through the selective unit 103 to the data lines D1~D20 and receives the sensing signal through the data lines D121~D140 to determine whether or not a touching event happens in the sensing loop. The sensing loops can be formed sequentially or formed at the same time. The sensing loops can overlap to one another to prevent a "sensing miss" case. For example, a sensing loop A and a sensing loop B are formed sequentially. The sensing loop A has a first main line composed of data lines D1~D10 and a second main line composed of data lines D111~D120. The sensing loop B has a first main line composed of data lines D100~D110 and a second main line composed of data lines D211~D220. Accordingly, the sensing loop A and the sensing loop B has a overlap region composed of data lines D100~D120 to prevent a "sensing miss" case.

In an embodiment, the switches are thin film transistors or other devices with the same function as the thin film transistors. When the switches are thin film transistors, the switches can be formed on the array substrate of the optical interference display unit 100. In another embodiment, the switches in the selective unit 103 can be integrated into the source driver 400, the switches in the selective unit 107 can be integrated into the gate driver 401.

Figure 5E:
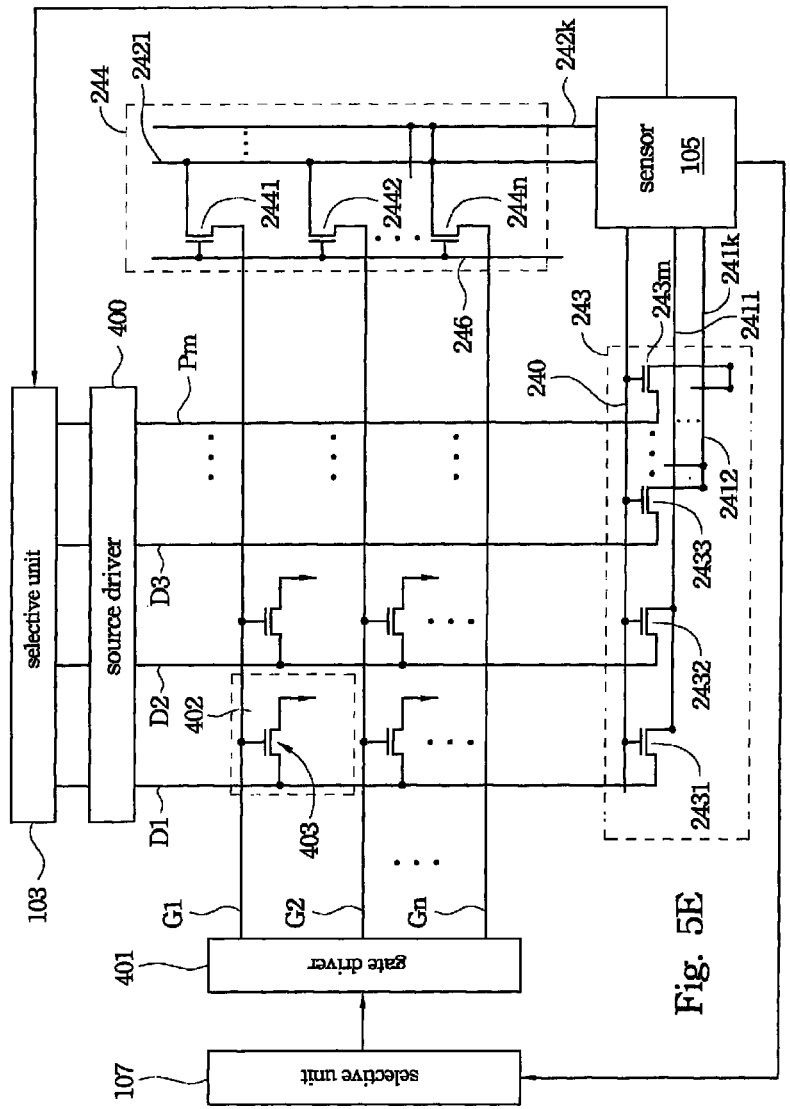
FIG. 5E illustrates a schematic diagram of an electrode structure of an optical interference display panel according to another embodiment of the present invention.

FIG. 5E illustrates a schematic diagram of an electrode structure of an optical interference display panel according to another embodiment of the present invention. The selective units 103 and 107 are controlled by the sensor 105. The control unit 243 includes a control line 240, a plurality of switch 2431~243m and transmission lines 2411~241k. The control line 240 switches the switches 2431~243m. The data lines D1, D2 ... Dm are connected to the transmission lines 2411~241k through the switches 2431~243m. Therefore, the data lines D1, D2 ... Dm can be connected to the sensor 105 through the transmission lines 2411~241k. In this embodiment, data lines D1, D2 are connected to the transmission line 2411 through the switches 2431 and 2432. Therefore, the data lines D1, D2 can be connected to the sensor 105 through the transmission line 2411. Data lines D3, D4 are connected to the transmission line 2411 through the switches 2433 and 2434. Therefore, the data lines D3, D4 can be connected to the sensor 105 through the transmission line 2412.

The sensor 105 controls the control line 240 to switch the switches 2431~243m to make the data lines D1~Dm to connect to corresponding transmission lines. The switches 2431~243m are thin film transistors (TFT). The gate electrodes of the TFTs are connected to the control line 240. When the control line 240 controls the TFTs to an off state, the connection between the data lines D1, D2 ... Dm and the transmission line 2411~241k is disconnected. When the control line 240 controls the TFTs to an on state, the control line 240 turns on the switches 2431~243m to make the data lines D1, D2 ... Dm connect with the transmission line 2411~241k to form a sensing loop to perform an electromagnetic touch sensing technology.

The control unit 244 includes a control line 246, a plurality of switch 2441~244n and a transmission lines 2421~242k. The control line 246 switches the switches 2441~244n. The scan lines G1, G2, ..., Gn are connected to the transmission lines 2421~242k through the switches 2441~244n. Therefore, the scan lines G1, G2, ..., Gn can be connected to the sensor 105 through the transmission lines 2421~242k. In this embodiment, scan lines G1, G2 are connected to the transmission line 2421 through the switches 2441 and 2442. Therefore, the Scan lines G1. G2 can be connected to the sensor 105 through the transmission line 2421. Scan lines G3. G4 are connected to the transmission line 2422 through the switches 2443 and 2444. Therefore, the scan lines G3, G4 can be connected to the sensor 105 through the transmission line 2422.

The sensor 105 controls the control line 246 to switch the switches 2441~244n to make the scan lines G1~Gn connect with corresponding transmission line to form a sensing loop to perform an electromagnetic touch sensing technology. In an embodiment, the switches 2441~244n are thin film transistors (TFT). The gate electrodes of the TFTs are connected to the control line 246. When the control line 246 controls the TFTs to an off state, the connection between the scan lines G1, G2, . . . , Gn and the transmission lines 2421~242k is disconnected. When the control line 246 controls the TFTs to an on state, the control line 246 turns on the switches 2441~244n to make the scan lines G1, G2, . . . , Gn connect with the transmission lines 2421~242k to form a sensing loop to perform an electromagnetic touch sensing technology.

When a capacitive touch sensing technology is performed, the sensor 105 controls the control unit 243 to disconnect the connection among the data lines D1, D2 . . . Dm and controls the control unit 244 to disconnect the connection among the scan lines G1, G2, . . . , Gn. Next, the sensor 105 senses the touch position. Typically, there are two types of the capacitive touch sensing technology. One is self-capacitance touch sensing technology. The other is Mutual-capacitance touch sensing technology.

Figure 6:
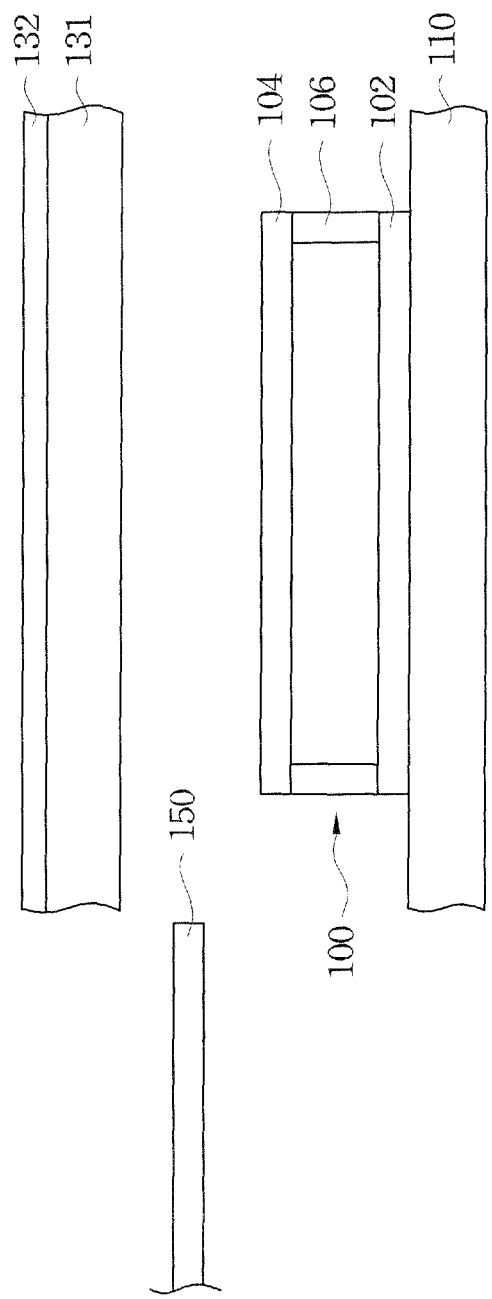
FIG. 6 illustrates a cross section view of an optical interference display panel according to a preferred embodiment of the present invention, wherein only one optical interference display unit is illustrated.

In the foregoing embodiment, the electrode structure of a touch device is integrated into the electrode structure of the optical interference display panel. However, in another embodiment, the electrode structure of a touch device is formed in different position in the optical interference display panel. FIG. 6 illustrates a cross section view of an optical interference display device according to a preferred embodiment of the present invention, wherein only one optical interference display unit is illustrated. The optical interference display device includes a first substrate 110, a second substrate 131 and an optical interference display unit 100 located between the first substrate 110 and the second substrate 131. The second substrate 131 is a cover lens. In another embodiment, the cover lens is formed over the second substrate 131.

In an embodiment, a touch panel 150 is disposed over the second substrate 131. In another embodiment, a touch panel 150 is disposed under the second substrate 131. In further embodiment, a touch panel 150 is disposed between the second substrate 131 and the optical interference display unit 100. In further embodiment, a touch panel 150 is disposed under the first substrate 110. That is, this touch panel 150 is disposed on a surface where no active array is formed.

Moreover, in another embodiment, for getting a uniform reflected light, a diffuser film 132 is disposed on the second substrate 131 to uniform the light. Accordingly, in this embodiment, the touch panel 150 is disposed over the diffuser film 132. Moreover, when a cover lens is disposed over the second substrate 131, the touch panel 150 is disposed over the cover lens. Or, in another embodiment, the touch panel 150 is disposed under the cover lens.

Figure 7:
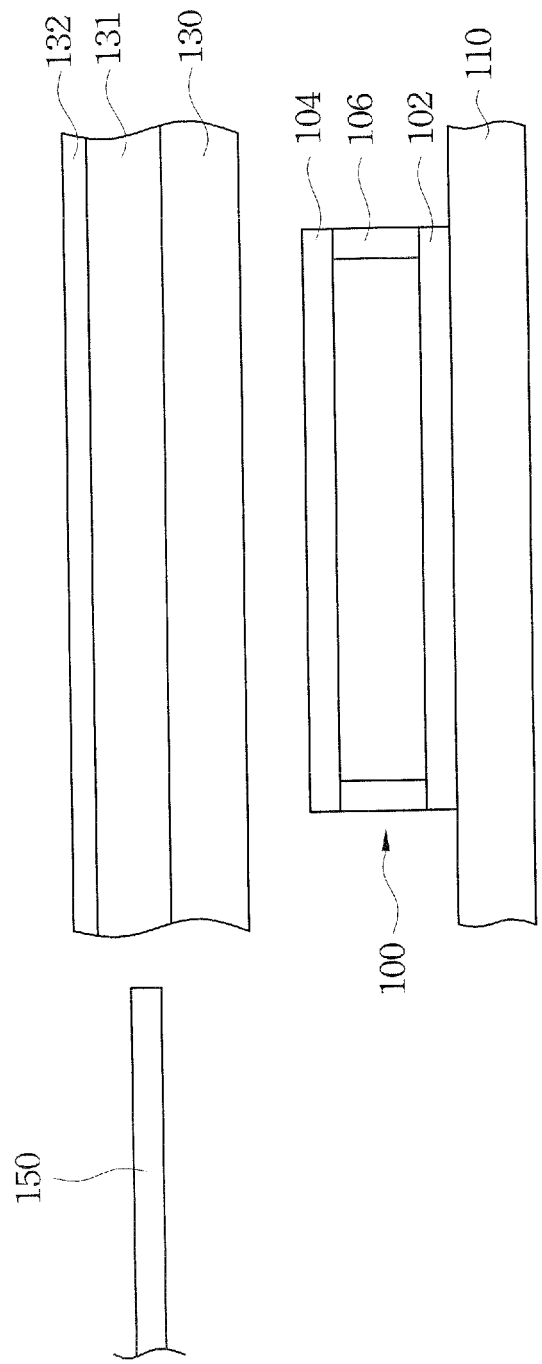
FIG. 7 illustrates a cross section view of a color optical interference display panel according to a preferred embodiment of the present invention, wherein only one optical interference display unit is illustrated.

FIG. 7 illustrates a cross section view of a color optical interference display device according to a preferred embodiment of the present invention, wherein only one optical interference display unit is illustrated. In this embodiment, a color filter 130 is disposed over the second substrate 131 of an optical interference display unit 100 to form a color optical interference display unit. The color optical interference display device includes a first substrate 110, a second substrate 131, a color filter 130 disposed on the second substrate 131 and an optical interference display unit 100 located between the first substrate 110 and the color filter 130. In another embodiment, the second substrate 131 further includes a cover lens. The cover lens is a protection glass.

In an embodiment, a touch panel 150 is disposed over the second substrate 131. In another embodiment, a touch panel 150 is disposed under the second substrate 131. In further embodiment, a touch panel 150 is disposed between the second substrate 131 and the optical interference display unit 100. In further embodiment, a touch panel 150 is disposed under the first substrate 110. That is, this touch panel 150 is disposed on a surface where no active array is formed.

Moreover, in another embodiment, for getting a uniform reflected light, a diffuser film 132 is disposed on the second substrate 131 to uniform the light. Accordingly, in this embodiment, the touch panel 150 is disposed over the diffuser film 132. Moreover; when a cover lens is disposed over the second substrate 131, the touch panel 150 is disposed over the cover lens. Or, in another embodiment, the touch panel 150 is disposed under the cover lens.

Figure 8:
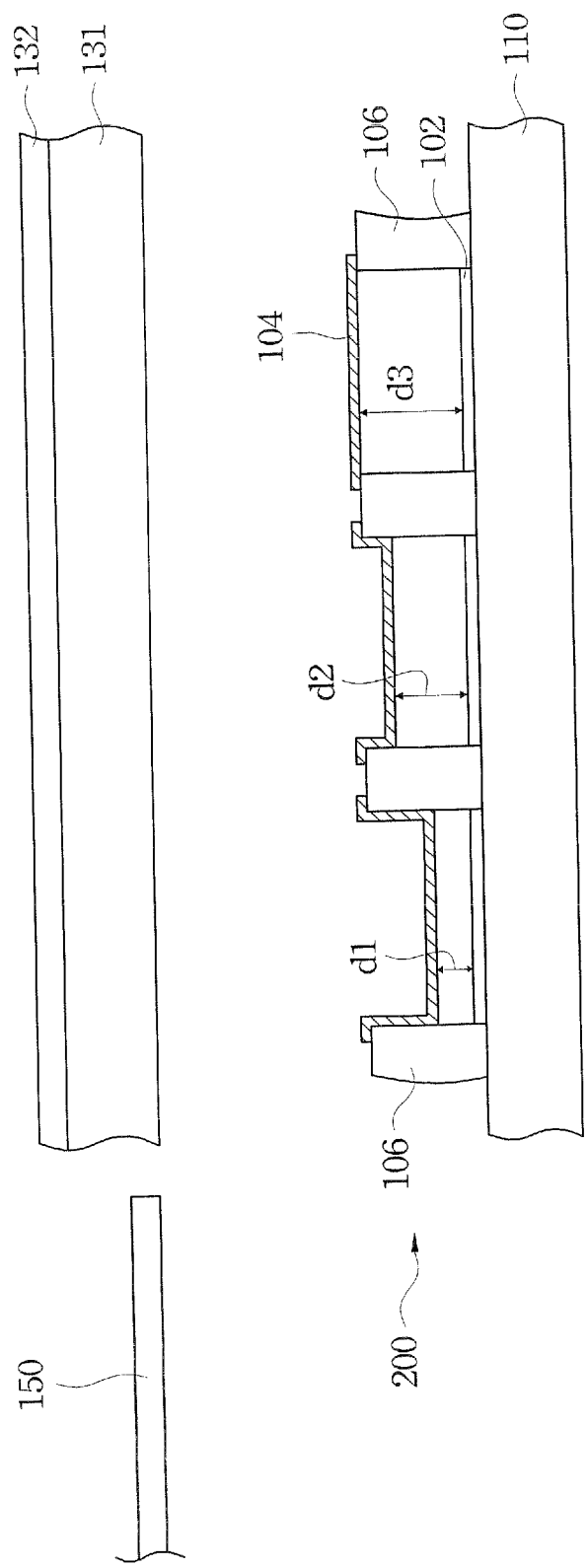
FIG. 8 illustrates a cross section view of an optical interference display panel according to another embodiment of the present invention, wherein only one optical interference display unit is illustrated.

FIG. 8 illustrates a cross section view of an optical interference display device according to another embodiment of the present invention, wherein only one color optical interference display unit is illustrated. The color optical interference display device includes a first substrate 110, a second substrate 131, a color optical interference display unit 200 located between the first substrate 110 and the second substrate 131. In another embodiment, the second substrate 131 further includes a cover lens. The cover lens is a protection glass.

In an embodiment, a touch panel 150 is disposed over the second substrate 131. In another embodiment, a touch panel 150 is disposed under the second substrate 131. That is, the touch panel 150 is disposed between the second substrate 131 and the color optical interference display unit 200. In further embodiment, a touch panel 150 is disposed under the first substrate 110. That is, this touch panel 150 is disposed on a surface where no active array is formed.

Moreover, in another embodiment, for getting a uniform reflected light, a diffuser film 132 is disposed on the second substrate 131 to uniform the light. Accordingly, in this embodiment, the touch panel 150 is disposed over the diffuser film 132. Moreover, when a cover lens is disposed over the second substrate 131, the touch panel 150 is disposed over the cover lens. Or, in another embodiment, the touch panel 150 is disposed under the cover lens.

Figure 9:
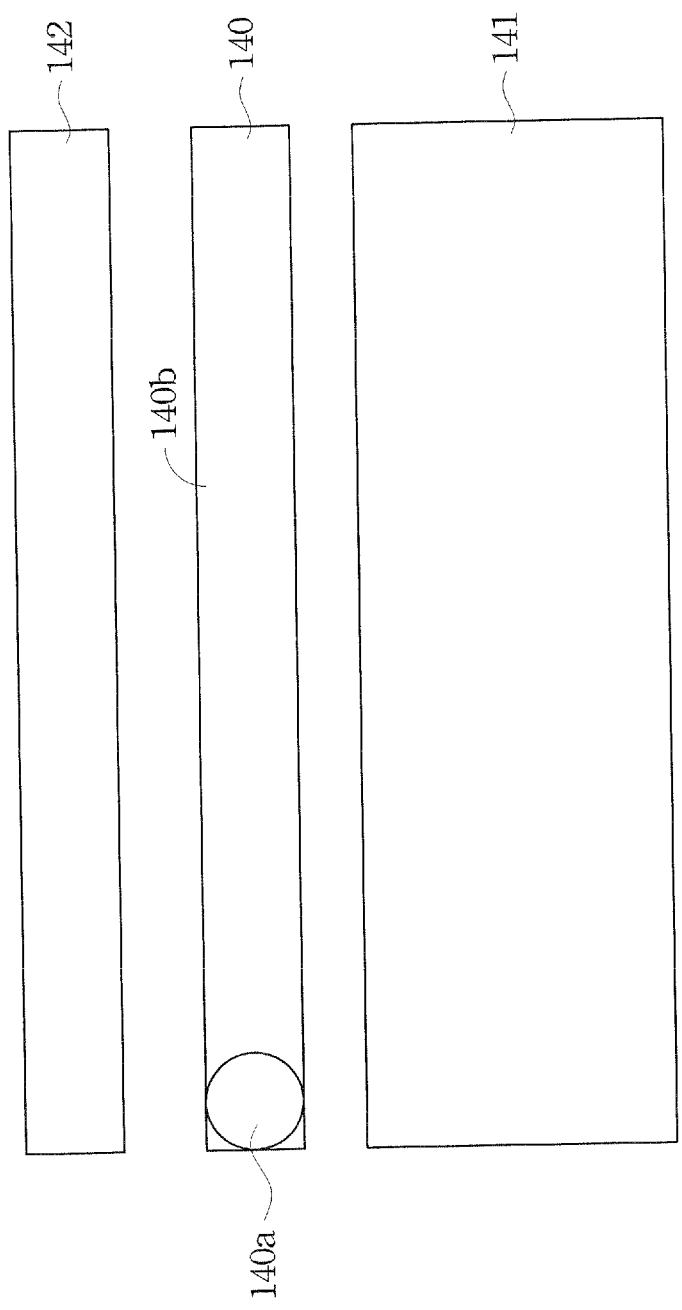
FIG. 9 illustrates a cross section view of an optical interference display panel with a light source according to a preferred embodiment of the present invention.

On the other hand, because the optical interference display unit 100 can not generate light, no reflected light is generated in the dark. That is, a person can not see anything in the optical interference display unit 100. Therefore, a front light source is disposed in the optical interference display unit 100 for providing light to illuminate the optical interference display unit 100. FIG. 9 illustrates a cross section view of an optical interference display panel with a light source according to a preferred embodiment of the present invention.

The optical interference display panel includes an optical interference display device 141, a front light source 140 disposed over the optical interference display device 141, and a cover lens or protection unit 142 over the front light source 140. The cover lens 142 is a glass. The front light source 140 provides light to illuminate the optical interference display device 141. The front light source 140 includes a light source 140a and a light guide plate 140b. The light guide plate 140b guides the light to illuminate the optical interference display device 141. The light source 140a is disposed on a side of the light guide plate 140b. The light from the light source 140a is transferred to the light guide plate 140b. The light guide plate 140b guides the light from the surface of the light guide plate 140b facing the optical interference display device 141 to illuminate the optical interference display device 141. Accordingly, a uniform light source is provided to the optical interference display device 141.

In this embodiment, a touch panel 150 is disposed over the protection unit 142. In another embodiment, a touch panel 150 is disposed under the protection unit 142. That is, the touch panel 150 is disposed between the protection unit 142 and the front light source 140. In further embodiment, a touch panel 150 is disposed under the first substrate 110. That is, this touch panel 150 is disposed on a surface where no active array is formed. The light source 140a generates white light or generates different color lights in different time. The sensor of the touch panel 150 is disposed under the front light source 141. Or, the sensor of the touch panel 150 is disposed under the protection unit 412.

Figure 10:
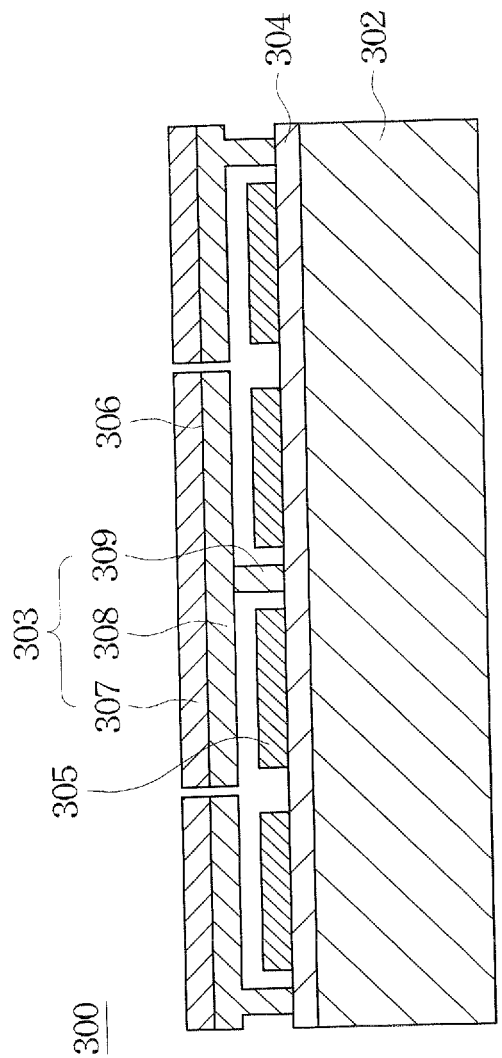
FIG. 10 illustrates a cross section view of a micro-lens array according to a preferred embodiment of the present invention.

FIG. 10 illustrates a cross section view of a micro-lens array according to a preferred embodiment of the present invention. The micro-lens array 200 includes a plurality of micro-lens 301 arranged in an array and disposed on the substrate 302. Each micro-lens includes a mirror 303 and two control electrodes 305 and 306. The mirror 303 is square. The length of the mirror 303 is about 5 um to 30 um. The mirror 303 includes a reflection surface 307, a support platform 308 and an elastic handle 309. The mirror 303 can be tilted about +25 degrees to −25 degrees from a tilt axle. The mirror 303 is connected to the substrate 302 through the elastic handle 309. The elastic handle 309 moves the reflection surface 307. The control electrode 305 and 306 are disposed on both sides of the elastic handle 309. A control circuit located in the substrate 302 controls the two control electrodes 305 and 306 to tilt the mirror 303. In an embodiment, the control electrodes 305 and 306 generate a static electricity attractive force to attract the elastic handle 309 to move the mirror 303 toward the control electrode 305 or 306. The elastic handle 309 is a prop connected with the mirror 303. Or, partial of the elastic handle 309 is expanded from the tilt axle to form a support wall to support the mirror 303. The control circuit includes memory cell formed by CMOS SRAM. In other words, when a micro-lens array is fabricated, the memory cell 304 fabricated on the substrate 302 first. Then, the control electrodes 305 and 306 are fabricated.

In this structure, the electrode structure of the CMOS memory circuit can be used as the touch electrode of a touch device. It is noticed that the drive method for the optical interference display unit described in the above may be also used in the micro-lens array 300. The sensor and the drive integrated circuit may be formed in the substrate of MEMS or Wafer. The volume can be reduced.

Figure 11:
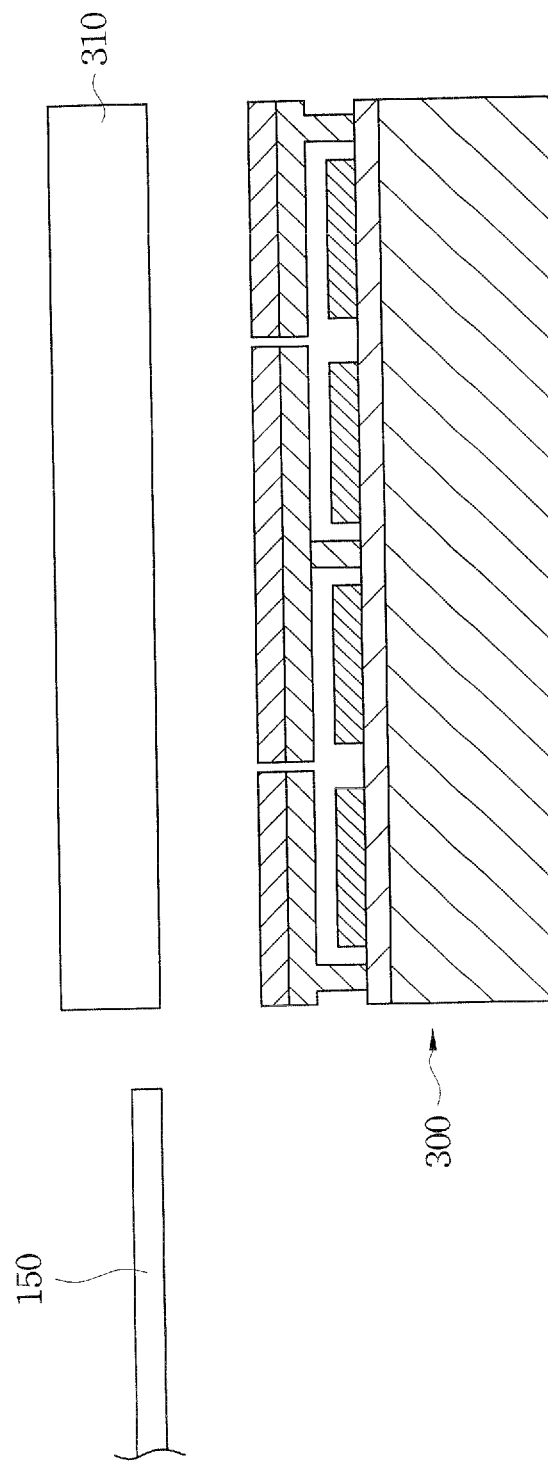
FIG. 11 illustrates a cross section view of a micro-lens array according to another embodiment of the present invention.

Moreover, the sensor and the drive integrated circuit are also formed in different positions of a display system with the micro-lens array apparatus 300. FIG. 11 illustrates a cross section view of a display system with micro-lens array apparatus according to another embodiment of the present invention. The display system includes a micro-lens array apparatus 300 and a second substrate 310. The second substrate 310 further includes a cover lens. The cover lens is a protection glass. In an embodiment, a touch panel 150 is disposed over the second substrate 310. In another embodiment, a touch panel 150 is disposed under the second substrate 310. In further embodiment, a touch panel 150 is disposed between the second substrate 310 and the micro-lens array apparatus 300. In further embodiment, a touch panel 150 is disposed under the f micro-lens array apparatus 300.

Because the micro-lens array apparatus 300 can not generate light, no reflected light is generated in the dark. That is, a person can not see anything in the micro-lens array apparatus 300. Therefore, a front light source is disposed in the micro-lens array apparatus 300 for providing light to illuminate the micro-lens array apparatus 300.

Figure 12:
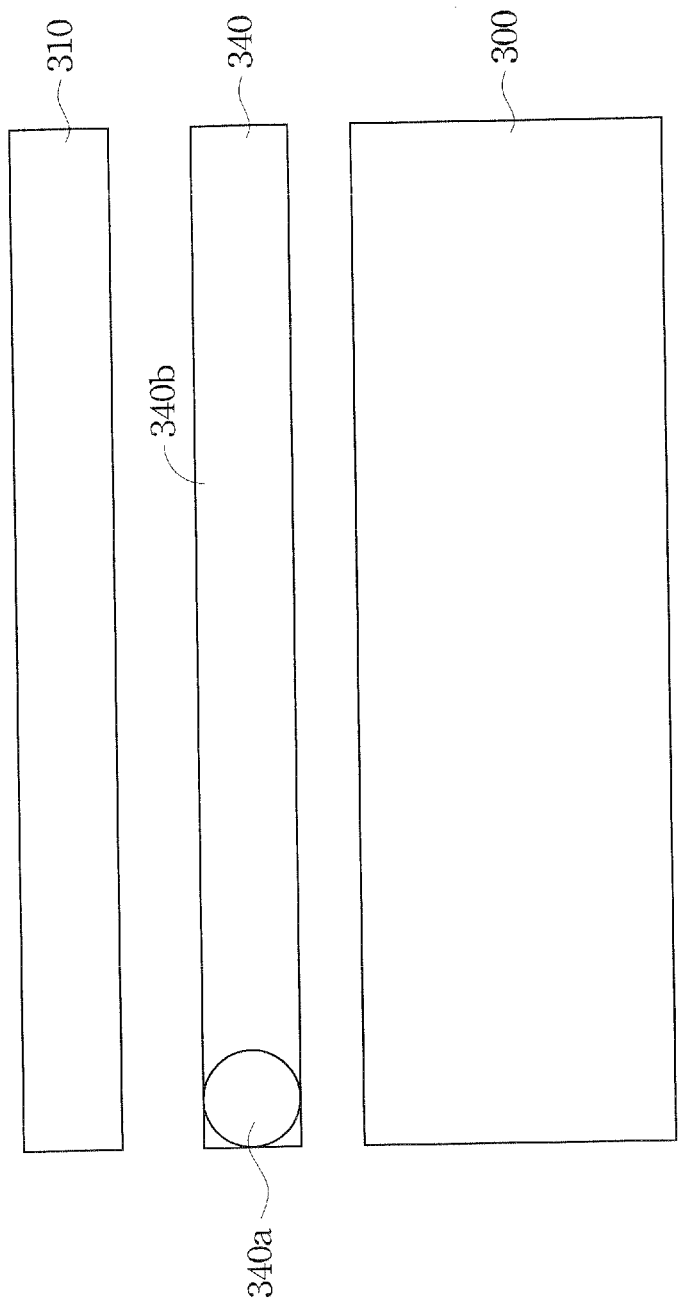
FIG. 12 illustrates a cross section view of a micro-lens array with light source according to a preferred embodiment of the present invention.

FIG. 12 illustrates a cross section view of a micro-lens array apparatus with light source according to a preferred embodiment of the present invention. The micro-lens array panel includes the micro-lens array apparatus 300, a front light source 340 disposed over the micro-lens array apparatus 300, and a cover lens or protection unit 310 over the front light source 340. The cover lens 310 is a glass. The front light source 340 provides light to illuminate the micro-lens array apparatus 300. The front light source 340 includes a light source 340a and a light guide plate 340b. The light guide plate 340b guides the light to illuminate the micro-lens array apparatus 300. The light source 340a is disposed on a side of the light guide plate 340b. The light from the light source 140a is transferred to the light guide plate 340b. The light guide plate 340b guides the light from the surface of the light guide plate 340b facing the micro-lens array apparatus 300 to illuminate the micro-lens array apparatus 300. Accordingly, a uniform light source is provided to the micro-lens array apparatus 300.

In this embodiment, a touch panel 150 is disposed over the protection unit 310. In another embodiment, a touch panel 150 is disposed under the protection unit 310. That is, the touch panel 150 is disposed between the protection unit 310 and the front light source 340. The light source 340a generates white light or generates different color lights in different time.

When the micro-lens array apparatus 300 is disposed in HMD or pico display, the HMD or pico display can provide light source for the micro-lens array apparatus 300. In these cases, a touch sensing process that is performed by the micro-lens array apparatus 300 is when the light source is turned off.

Accordingly, a touch sensor is integrated into the MEMS display system. Therefore, a user can use the touch panel to control the MEMS display system, which is convenience for the user. Moreover, the data lines D1, D2 . . . Dm and the scan lines G1, G2, . . . , Gn can be used to serve as the electrode of the dual-mode touch sensor of the present invention. Accordingly, it is not necessary to form additional electrodes for sensing the touch position. Therefore, the production cost is reduced and the production yield is kept.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display system using microelectromechanical system (MEMS), comprising:
 a first substrate;
 a touch control unit for detecting a touch position; and
  a plurality of MEMS display units disposed in the first substrate, wherein the touch control unit controls the MEMS display units,
  wherein the touch control unit further comprises:
   a sensor;
   a first selective unit coupling with the sensor;
   a second selective unit coupling with the sensor;
   a first control unit coupling with the sensor;
   a second control unit coupling with the sensor;
   a plurality of first conductive lines arranged in parallel to each other and in a first direction, each of the first conductive lines has a first end and a second end, the first end of each of the first conductive lines couples with the first control unit, the second end of each of the first conductive lines couples with the first selective unit; and a plurality of second conductive lines arranged in parallel to each other and in a second direction, each of the second conductive lines has a first end and a second end, the first end of each of the second conductive lines couples with the second control unit, the second end of each of the second conductive lines couples with the second selective unit; and a plurality of transistors forming in positions that the first conductive lines cross the second conductive lines respectively;

wherein the MEMS display units are optical interference display units, each of the optical interference display units further comprises a first electrode formed on the first substrate and a second electrode formed over the first electrode, the first electrodes couple with a common electrode, the second electrodes couple with the transistors, signals in the first conductive lines control movement, deformation, vibration or rotation of the second electrodes through the transistors.

2. The display system of claim 1, wherein each of the optical interference display unit has a single cavity or a plurality of cavities.

3. The display system of claim 2, the system further comprises a cover lens disposed over the optical interference display units.

4. The display system of claim 2, wherein each of the optical interference display units further comprises:
a post disposed between the first electrode and the second electrode to support the second electrode, a cavity is formed between the first electrode and the second electrode;
wherein the touch control unit moves the second electrode related to the first electrode.

5. The display system of claim 2, wherein the plurality of cavities have different depths of cavity.

6. The display system of claim 5, wherein the plurality of cavities have three depths of cavity to reflect or transmissive red light, green light and blue light respectively.

7. The display system of claim 5, wherein the plurality of cavities composed of a optical interference display to reflect or transmissive cyan color light, magenta color light, and yellow color light.

8. The display system of claim 1, wherein the first substrate is a semiconductor substrate, the MEMS display units are micro-lens apparatus, the micro-lens apparatus includes a plurality of micro-lens arranged in array and located on the first substrate, wherein each of the micro-lens includes a mirror and at least two control electrodes, wherein the touch control unit controls tilt angle, and tilt direction of the micro-lens.

9. The display system of claim 8, wherein when a light source is provided to the micro-lens apparatus, a touch sensing process is performed when the light source is turned off.

10. The display system of claim 1, the system further comprises a color filter disposed over the MEMS display units, and a cover lens disposed over the color filter, wherein the touch control unit is disposed inside of the cover lens, disposed outside of the cover lens, disposed in the cover lens, or disposed between the cover lens and the color filter, or disposed between the color filter and the MEMS display units.

11. The display system of claim 1, wherein the touch control unit detects the touch position by a resistive touch sensing technology, an electromagnetic touch sensing technology, a capacitive touch sensing technology, an optical sensing technology, an Ultrasonic sensing technology, a pressure sensing technology, a Surface acoustic wave sensing technology or any combination of the above.

12. The display system of claim 1, further comprising a front light source disposed over the MEMS display units, wherein the front light source is a white light source, a single color light source or comprises a plurality of color light source.

13. The display system of claim 12, wherein a touch sensing process is performed on the MEMS display units when the front light source is turned off wherein the touch control unit is disposed over the front light source.

14. The display system of claim 1, wherein when the touch control unit performs an electromagnetic touch sensing technology, the first control unit connects the second end of each of the first conductive lines to a first transmission line and the first selective unit sequentially connects the first ends of the first conductive lines based on an order to form sensing loops in the first direction;
the second control unit connects the second end of each of the second conductive lines to a second transmission line, the second selective unit sequentially connects the first ends of the second conductive lines based on an order to form sensing loops in the second direction; and
a first sensing method is performed to sense the magnetic flux, electromagnetic induction, current, voltage or frequency of sensing loops to determine distance, height, strength, a touch position or a touch strength.

15. The display system of claim 14, further comprising:
grouping the first conductive lines and the second conductive lines, wherein each group includes at least two first conductive lines, or at least two second conductive lines;
the first selective unit sequentially connects the first ends of the first conductive lines in each group based on an order to form sensing loops in the first direction;
the second selective unit sequentially connects the first end of the second conductive lines in each group based on an order to form sensing loops in the second direction;
transferring a sensing signal to the sensing loops; and
performing the first sensing method to sense the magnetic flux, electromagnetic induction, current, voltage or frequency of sensing loops to determine, distance, height, strength, a touch position or a touch strength.

16. The display system of claim 15, wherein the first sensing method is to transfer a sensing signal with a special frequency to the sensing loops to sense the magnetic flux, electromagnetic induction, current, voltage or frequency of the sensing loops, wherein the sensor determine whether or not the magnetic flux, electromagnetic induction, current or frequency of the sensing loops are changed.

17. The display system of claim 1, wherein when the touch control unit performs a capacitive touch sensing technology, the first control unit disconnects the connection between the second end of each of the first conductive lines and a first transmission line, and the second control unit disconnects the connection between the second end of each of the second conductive lines and a second transmission line, and a second sensing method is performed to sense the capacitance, current or voltage to determine, distance, height, strength, a touch position or a touch strength.

* * * * *